(12) United States Patent
Wang

(10) Patent No.: US 12,554,104 B2
(45) Date of Patent: Feb. 17, 2026

(54) OPTICAL LENS ASSEMBLY

(71) Applicant: NEWMAX TECHNOLOGY CO., LTD., Taichung (TW)

(72) Inventor: Chi-Chang Wang, Taichung (TW)

(*) Notice: Subject to any disclaimer, the term of this patent is extended or adjusted under 35 U.S.C. 154(b) by 302 days.

(21) Appl. No.: 18/534,690

(22) Filed: Dec. 10, 2023

(65) Prior Publication Data

US 2025/0102772 A1    Mar. 27, 2025

(30) Foreign Application Priority Data

Sep. 26, 2023  (TW) .................................. 112136710

(51) Int. Cl.
  *G02B 13/00*    (2006.01)
  *G02B 9/64*    (2006.01)
  *G02B 27/00*    (2006.01)

(52) U.S. Cl.
  CPC ........... *G02B 13/0045* (2013.01); *G02B 9/64* (2013.01); *G02B 27/0025* (2013.01)

(58) Field of Classification Search
  CPC ... G02B 13/0045; G02B 9/64; G02B 27/0025
  USPC ......................................... 359/642, 750, 754
  See application file for complete search history.

(56) References Cited

U.S. PATENT DOCUMENTS

2021/0063697 A1*  3/2021  Li .............................. G02B 9/64

* cited by examiner

*Primary Examiner* — William Choi
(74) *Attorney, Agent, or Firm* — Bruce Stone LLP; Joseph A. Bruce

(57) ABSTRACT

An optical lens assembly includes, in order from an object side to an image side: a first lens; a second lens; a third lens; a fourth lens; a fifth lens; a sixth lens; a seventh lens; and an eighth lens; wherein an incident angle of a chief ray on an image plane at a maximum view angle of the optical lens assembly is CRA, a distance from an image-side surface of the eighth lens to the image plane along an optical axis is BFL, an absolute value of a displacement in parallel to the optical axis from an intersection between an object-side surface of the eighth lens and the optical axis to a maximum effective radius position on the object-side surface of the eighth lens is TDP15, and the following condition is satisfied: $19.04° < CRA*BFL/TDP15 < 74.78°$.

15 Claims, 14 Drawing Sheets

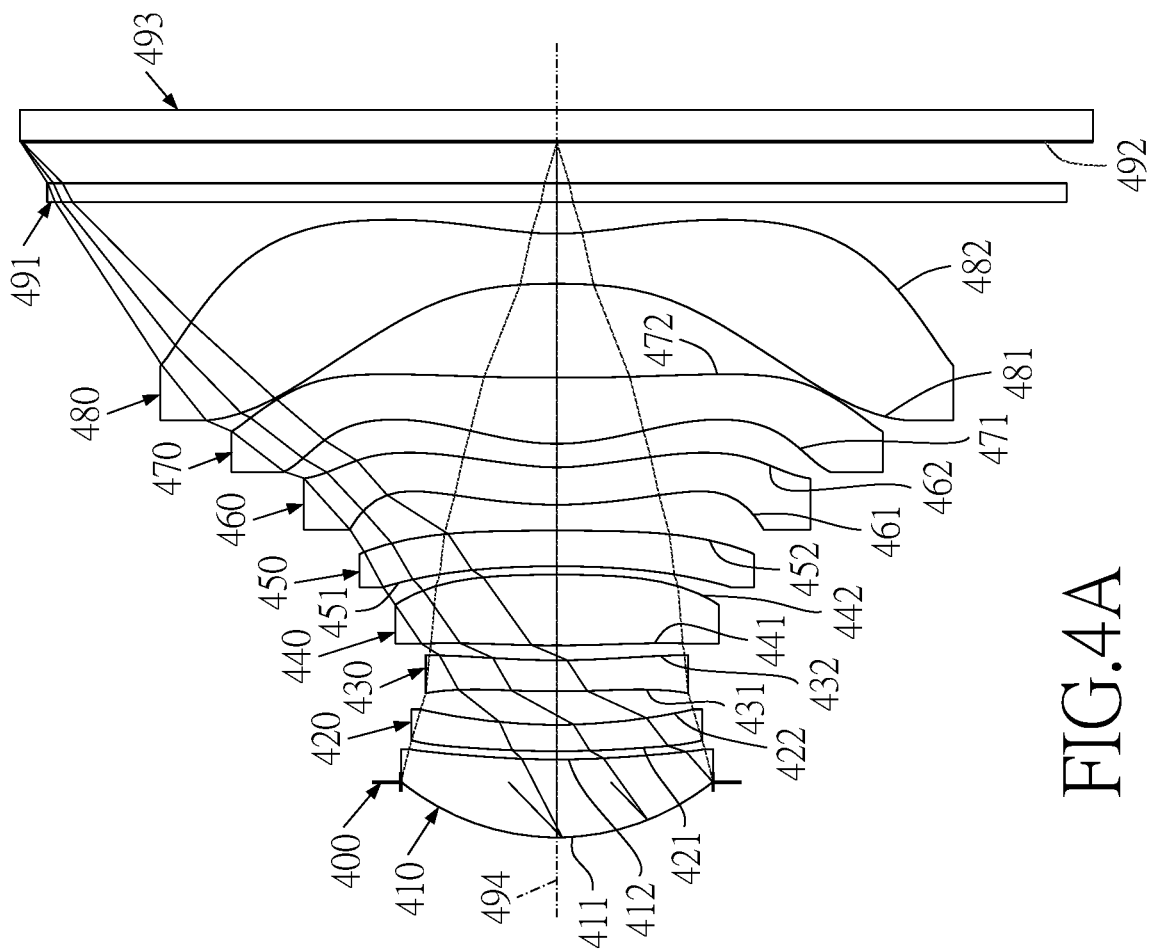

OPTICAL LENS ASSEMBLY

BACKGROUND

Field of the Invention

The present invention relates to an optical lens assembly, and more particularly to an optical lens assembly applicable to electronic products.

Description of Related Art

Small camera lens devices can be widely used in various electronic devices, such as, wearable display, smart phone, tablet computer, game player, dashcam, household electronic device, IP network camera (IPCAM), sports camera or camera drone and so on. Moreover, small camera lens devices have been trending lightweight, thin and short. The smaller the size is, more serious the sensitivity problem of manufacturing and assembly is, which makes mass production difficult and increases the cost of mass production. Or, the quality of the periphery of the image has to be sacrificed for the reducing of the assembly tolerance, so that the periphery of the image becomes blurred or deformed. Therefore, how to develop a small camera lens device that can solve one of the aforementioned problems is presently the technical bottleneck to be conquered.

The present invention mitigates and/or obviates the aforementioned disadvantages.

SUMMARY

The objective of the present invention is to provide an optical lens assembly, and the optical lens assembly has a total of eight lenses with refractive power. When a specific condition is satisfied, the optical lens assembly can solve the sensitivity and image quality problems of small lens devices, and has a large aperture, a large field of view, high resolution, low distortion and low tolerance of manufacturing and assembly, so as to enhance product quality and yield.

In addition, when the lens is made of glass, the optical lens assembly of the present invention can be used at more extreme temperatures.

Therefore, an optical lens assembly in accordance with an embodiment of the present invention includes, in order from an object side to an image side: a first lens with positive refractive power; a second lens with negative refractive power; a third lens with negative refractive power; a fourth lens with refractive power; a fifth lens with refractive power; a sixth lens with refractive power; a seventh lens with refractive power; and an eighth lens with negative refractive power.

In the optical lens assembly, an incident angle of a chief ray on an image plane at a maximum view angle of the optical lens assembly is CRA, a maximum effective radius of an object-side surface of the first lens is CA1, a maximum effective radius of an image-side surface of the eighth lens is CA16, a radius of curvature of an object-side surface of the first lens is R1, a radius of curvature of an image-side surface of the first lens is R2, a radius of curvature of an object-side surface of the fourth lens is R7, a radius of curvature of an object-side surface of the sixth lens is R11, a radius of curvature of an image-side surface of the sixth lens is R12, a radius of curvature of an object-side surface of the seventh lens is R13, a radius of curvature of an image-side surface of the seventh lens is R14, a maximum field of view of the optical lens assembly is FOV, half of the maximum field of view of the optical lens assembly is HFOV, an entrance pupil diameter of the optical lens assembly is EPD, a distance from the image-side surface of the eighth lens to the image plane along the optical axis is BFL, a distance from the object-side surface of the first lens to the image plane along the optical axis is TL, a maximum image height of the optical lens assembly is IMH, a focal length of the optical lens assembly is f, a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, a focal length of the eighth lens is f8, an Abbe number of the third lens is Vd3, an Abbe number of the fifth lens is Vd5, an Abbe number of the seventh lens is Vd7, an Abbe number of the eighth lens is Vd8, an absolute value of a displacement in parallel to the optical axis from an intersection between the object-side surface of the sixth lens and the optical axis to a maximum effective radius position on the object-side surface of the sixth lens is TDP11, an absolute value of a displacement in parallel to the optical axis from an intersection between the object-side surface of the eighth lens and the optical axis to a maximum effective radius position on the object-side surface of the eighth lens is TDP15, and at least one of the following conditions is satisfied:

$$19.04° < CRA*BFL/TDP15 < 74.78°;$$
$$22.00 \text{ mm} < TL*TDP15/TDP11 < 131.36 \text{ mm};$$
$$22.18° < CRA*CA16/IMH < 40.26°;$$
$$6.46 \text{ mm} < EPD*(CA16/CA1) < 11.65 \text{ mm};$$
$$0.73 < f5/f6 < 12.36;$$
$$4.35 < R7/R13 < 9.18;$$
$$-32.47 \text{ mm} < f2*(R1/R12) < -9.59 \text{ mm};$$
$$-0.14 < R2/R14 < 2.23;$$
$$2.09 < (Vd7+Vd8)/(Vd3+Vd5) < 3.22;$$
$$0.92 < \tan(HFOV)*TL/IMH < 1.51;$$
$$0.79 < f1/R11 < 1.65;$$
$$0.29 < f/f4 < 0.5;$$
$$-209.04 \text{ mm} < f3*(FOV/CRA) < -51.63 \text{ mm};$$

and $$3.97 < f3/f8 + f4/f7 < 21.89.$$

When 19.04°<CRA*BFL/TDP15<74.78° is satisfied, it is conducive to achieving an appropriate balance between miniaturization and the back focal length.

When 22.00 mm<TL*TDP15/TDP11<131.36 mm is satisfied, it is conducive to achieving the miniaturization of module.

When 22.18°<CRA*CA16/IMH<40.26° is satisfied, it is conducive to achieving the miniaturization of module and matching an incident angle of a chief ray at a maximum view angle of an image sensor.

When 6.46 mm<EPD*(CA16/CA1)<11.65 mm is satisfied, it is conducive to ensuring that the optical lens assembly has sufficient refractive power to shorten the length of the optical lens assembly.

When 0.73<f5/f6<12.36 is satisfied, it is conducive to achieving more appropriate distribution of refractive power of the optical lens assembly to correct the aberration of the optical lens assembly, thereby enhancing the image quality of the optical lens assembly.

When 4.35<R7/R13<9.18 is satisfied, it is conducive to enhancing the image quality by adjusting the radii of curvature of the lenses.

When −32.47 mm<f2*(R1/R12)<−9.59 mm is satisfied, it is conducive to enhancing the image quality by adjusting the radii of curvature of the lenses.

When −0.14<R2/R14<2.23 is satisfied, it is conducive to enhancing the image quality by adjusting the radii of curvature of the lenses.

When 2.09<(Vd7+Vd8)/(Vd3+Vd5)<3.22 is satisfied, it is conducive to effectively balancing the color difference of the optical lens assembly to avoid overcorrection.

When 0.92<tan (HFOV)*TL/IMH<1.51 is satisfied, it is conducive to achieving the large field of view and the miniaturization of module.

When 0.79<f1/R11<1.65 is satisfied, it is conducive to effectively controlling the radius of curvature of the sixth lens to achieve smaller aberration.

When 0.29<f/f4<0.5 is satisfied, it is conducive to achieving more appropriate distribution of refractive power of the optical lens assembly to correct the aberration of the optical lens assembly, thereby enhancing the image quality of the optical lens assembly.

When −209.04 mm<f3*(FOV/CRA)<−51.63 mm is satisfied, it is conducive to obtaining a larger field of view.

When 3.97<f3/f8+f4/f7<21.89 is satisfied, it is conducive to achieving more appropriate distribution of refractive power of the optical lens assembly to correct the aberration of the optical lens assembly, thereby enhancing the image quality of the optical lens assembly.

Optionally, the optical lens assembly has a total of eight lenses with refractive power.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 4A is a schematic view of an optical lens assembly in accordance with a fourth embodiment of the present invention;

DETAILED DESCRIPTION

First Embodiment

Figure 1A:
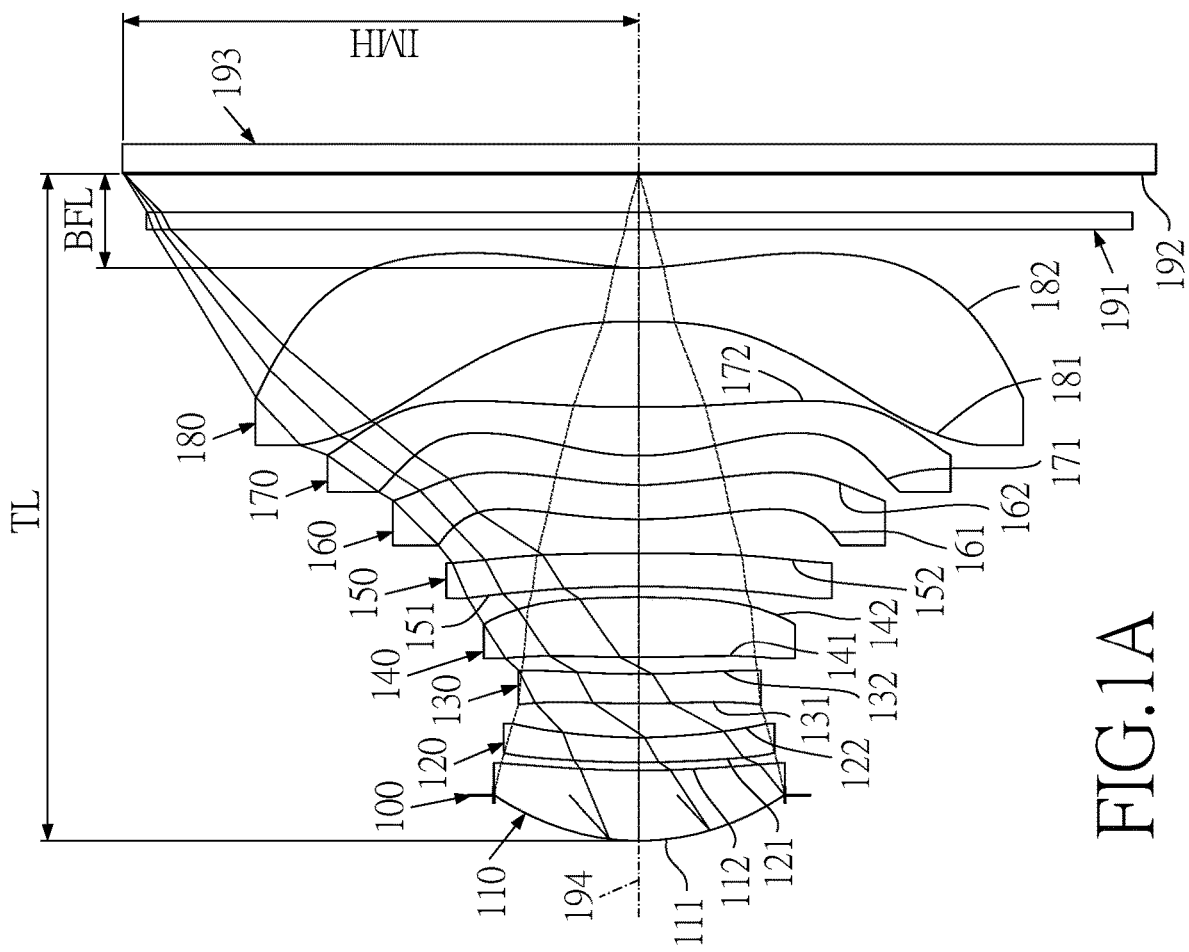
FIG. 1A is a schematic view of an optical lens assembly in accordance with a first embodiment of the present invention.
Figure 1B:
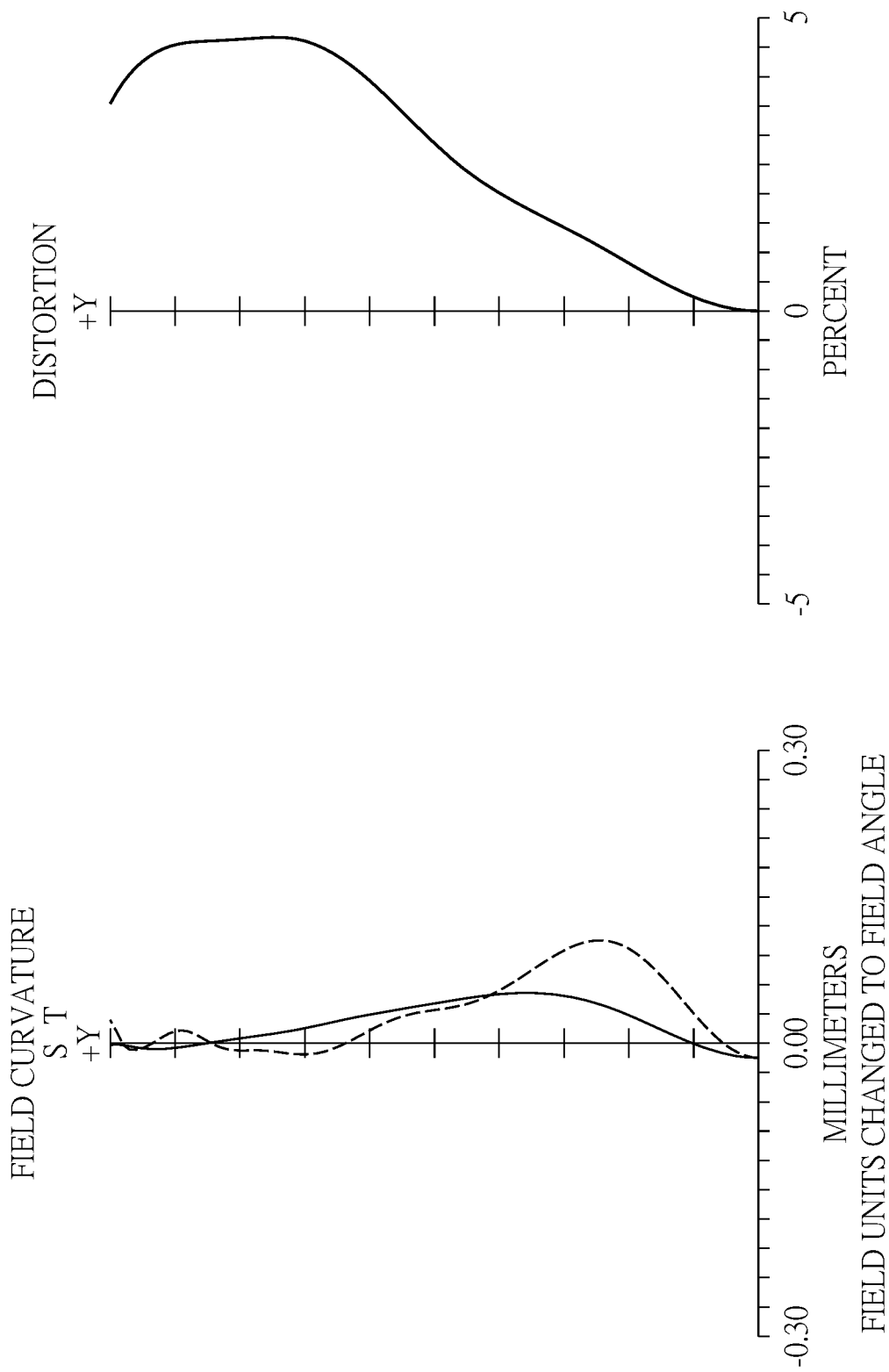
FIG. 1B is a schematic diagram showing, in order from left to right, the field curvature curve and the distortion curve of the first embodiment of the present invention.

Referring to FIGS. 1A and 1B, FIG. 1A shows a schematic view of an optical lens assembly in accordance with a first embodiment of the present invention, and FIG. 1B shows, in order from left to right, the field curvature curve and the distortion curve of the first embodiment of the present invention. As shown in FIG. 1A, the optical lens assembly includes, in order from an object side to an image side along an optical axis 194: a stop 100, a first lens 110, a second lens 120, a third lens 130, a fourth lens 140, a fifth lens 150, a sixth lens 160, a seventh lens 170, an eighth lens 180, an optical filter 191, and an image plane 192. The optical lens assembly can cooperate with an image sensor 193 disposed on the image plane 192. The optical lens assembly has a total of eight lenses with refractive power, but is not limited thereto.

The first lens 110 with positive refractive power includes an object-side surface 111 and an image-side surface 112, the object-side surface 111 of the first lens 110 is convex in a paraxial region thereof, the image-side surface 112 of the first lens 110 is concave in a paraxial region thereof, the object-side surface 111 and the image-side surface 112 of the first lens 110 are aspheric, and the first lens 110 is made of plastic.

The second lens 120 with negative refractive power includes an object-side surface 121 and an image-side surface 122, the object-side surface 121 of the second lens 120 is convex in a paraxial region thereof, the image-side surface 122 of the second lens 120 is concave in a paraxial region thereof, the object-side surface 121 and the image-side surface 122 of the second lens 120 are aspheric, and the second lens 120 is made of plastic.

The third lens 130 with negative refractive power includes an object-side surface 131 and an image-side surface 132, the object-side surface 131 of the third lens 130 is convex in a paraxial region thereof, the image-side surface 132 of the third lens 130 is concave in a paraxial region thereof, the object-side surface 131 and the image-side surface 132 of the third lens 130 are aspheric, and the third lens 130 is made of plastic.

The fourth lens 140 with positive refractive power includes an object-side surface 141 and an image-side surface 142, the object-side surface 141 of the fourth lens 140 is convex in a paraxial region thereof, the image-side surface 142 of the fourth lens 140 is convex in a paraxial region thereof, the object-side surface 141 and the image-side surface 142 of the fourth lens 140 are aspheric, and the fourth lens 140 is made of plastic.

The fifth lens 150 with negative refractive power includes an object-side surface 151 and an image-side surface 152, the object-side surface 151 of the fifth lens 150 is concave in a paraxial region thereof, the image-side surface 152 of the fifth lens 150 is convex in a paraxial region thereof, the object-side surface 151 and the image-side surface 152 of the fifth lens 150 are aspheric, and the fifth lens 150 is made of plastic.

The sixth lens 160 with negative refractive power includes an object-side surface 161 and an image-side surface 162, the object-side surface 161 of the sixth lens 160 is convex in a paraxial region thereof, the image-side surface 162 of the sixth lens 160 is concave in a paraxial region thereof, the object-side surface 161 and the image-side surface 162 of the sixth lens 160 are aspheric, and the sixth lens 160 is made of plastic.

The seventh lens 170 with positive refractive power includes an object-side surface 171 and an image-side surface 172, the object-side surface 171 of the seventh lens 170 is convex in a paraxial region thereof, the image-side surface 172 of the seventh lens 170 is concave in a paraxial region thereof, the object-side surface 171 and the image-side surface 172 of the seventh lens 170 are aspheric, and the seventh lens 170 is made of plastic.

The eighth lens 180 with negative refractive power includes an object-side surface 181 and an image-side surface 182, the object-side surface 181 of the eighth lens 180 is concave in a paraxial region thereof, the image-side surface 182 of the eighth lens 180 is concave in a paraxial region thereof, the object-side surface 181 and the image-side surface 182 of the eighth lens 180 are aspheric, and the eighth lens 180 is made of plastic.

The optical filter 191 is made of glass, is located between the eighth lens 180 and the image plane 192, and has no influence on the focal length of the optical lens assembly. In the present embodiment, the optical filter 191 is selected from IR-cut filters that allow visible light to pass therethrough.

The curve equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot (h^i)$$

wherein:
z represents the value of a reference position at a height of h with respect to a vertex of the surface of a lens along the optical axis 194;
c represents a paraxial curvature (i.e., a curvature of a lens surface in a paraxial region thereof) equal to 1/R (R: a paraxial radius of curvature);
h represents a vertical distance from the point on the curve of the aspheric surface to the optical axis 194;
k represents the conic constant; and
Ai represents the i-th order aspheric coefficient.

In the first embodiment of the optical lens assembly, a focal length of the optical lens assembly is f, a f-number of the optical lens assembly is Fno, a maximum field of view of the optical lens assembly is FOV, an entrance pupil diameter of the optical lens assembly is EPD, and the following conditions are satisfied: f=6.44 mm; Fno=1.86; FOV=84.9 degrees; and EPD=3.46 mm.

In the first embodiment of the optical lens assembly, an incident angle of a chief ray on the image plane 192 at a maximum view angle of the optical lens assembly is CRA, a distance from the image-side surface 182 of the eighth lens 180 to the image plane 192 along the optical axis 194 is BFL, an absolute value of a displacement in parallel to the optical axis 194 from an intersection between the object-side surface 181 of the eighth lens 180 and the optical axis 194 to a maximum effective radius position on the object-side surface 181 of the eighth lens 180 is TDP15, and the following condition is satisfied: CRA*BFL/TDP15=28.12°.

In the first embodiment of the optical lens assembly, a distance from the object-side surface 111 of the first lens 110 to the image plane 192 along the optical axis 194 is TL, an absolute value of a displacement in parallel to the optical axis 194 from an intersection between the object-side surface 161 of the sixth lens 160 and the optical axis 194 to a maximum effective radius position on the object-side surface 161 of the sixth lens 160 is TDP11, the absolute value of the displacement in parallel to the optical axis 194 from the intersection between the object-side surface 181 of the eighth lens 180 and the optical axis 194 to the maximum effective radius position on the object-side surface 181 of the eighth lens 180 is TDP15, and the following condition is satisfied: TL*TDP15/TDP11=37.99 mm.

In the first embodiment of the optical lens assembly, the incident angle of the chief ray on the image plane 192 at the maximum view angle of the optical lens assembly is CRA, a maximum effective radius of the image-side surface 182 of the eighth lens 180 is CA16, a maximum image height of the optical lens assembly is IMH, and the following condition is satisfied: CRA*CA16/IMH=27.72°.

In the first embodiment of the optical lens assembly, the entrance pupil diameter of the optical lens assembly is EPD, a maximum effective radius of the object-side surface 111 of the first lens 110 is CA1, the maximum effective radius of the image-side surface 182 of the eighth lens 180 is CA16, and the following condition is satisfied: EPD*(CA16/CA1)=9.13 mm.

In the first embodiment of the optical lens assembly, a focal length of the fifth lens 150 is f5, a focal length of the sixth lens 160 is f6, and the following condition is satisfied: f5/f6=7.84.

In the first embodiment of the optical lens assembly, a radius of curvature of the object-side surface 141 of the fourth lens 140 is R7, a radius of curvature of the object-side surface 171 of the seventh lens 170 is R13, and the following condition is satisfied: R7/R13=7.32.

In the first embodiment of the optical lens assembly, a focal length of the second lens 120 is f2, a radius of curvature of the object-side surface 111 of the first lens 110 is R1, a radius of curvature of the image-side surface 162 of the sixth lens 160 is R12, and the following condition is satisfied: f2*(R1/R12)=−23.69 mm.

In the first embodiment of the optical lens assembly, a radius of curvature of the image-side surface 112 of the first lens 110 is R2, a radius of curvature of the image-side surface 172 of the seventh lens 170 is R14, and the following condition is satisfied: R2/R14=0.29.

In the first embodiment of the optical lens assembly, an Abbe number of the third lens 130 is Vd3, an Abbe number of the fifth lens 150 is Vd5, an Abbe number of the seventh lens 170 is Vd7, an Abbe number of the eighth lens 180 is Vd8, and the following condition is satisfied: (Vd7+Vd8)/(Vd3+Vd5)=2.69.

In the first embodiment of the optical lens assembly, half of the maximum field of view of the optical lens assembly is HFOV, the distance from the object-side surface 111 of the first lens 110 to the image plane 192 along the optical axis 194 is TL, the maximum image height of the optical lens assembly is IMH, and the following condition is satisfied: tan (HFOV)*TL/IMH=1.20.

In the first embodiment of the optical lens assembly, a focal length of the first lens 110 is f1, a radius of curvature of the object-side surface 161 of the sixth lens 160 is R11, and the following condition is satisfied: f1/R11=1.15.

In the first embodiment of the optical lens assembly, a focal length of the optical lens assembly is f, a focal length of the fourth lens 140 is f4, and the following condition is satisfied: f/f4=0.41.

In the first embodiment of the optical lens assembly, a focal length of the third lens 130 is f3, the maximum field of view of the optical lens assembly is FOV, the incident angle of the chief ray on the image plane 192 at the maximum view angle of the optical lens assembly is CRA, and the following condition is satisfied: f3*(FOV/CRA)=−118.41 mm.

In the first embodiment of the optical lens assembly, the focal length of the third lens 130 is f3, the focal length of the fourth lens 140 is f4, a focal length of the seventh lens 170 is f7, a focal length of the eighth lens 180 is f8, and the following condition is satisfied: f3/f8+f4/f7=13.97.

Please refer to Tables 1-3. The detailed optical data of the respective elements in the optical lens assembly of the first embodiment is shown in Table 1, and the aspheric coefficients of the lenses in the first embodiment is shown in Table 2.

TABLE 1

Embodiment 1
f = 6.44 mm, Fno = 1.86, FOV = 84.85°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.550 | | | | |
| 2 | First lens | 2.961 | (ASP) | 0.838 | Plastic | 1.545 | 56.0 | 7.04 |
| 3 | | 11.567 | (ASP) | 0.103 | | | | |
| 4 | Second lens | 12.331 | (ASP) | 0.300 | Plastic | 1.671 | 19.2 | −27.70 |
| 5 | | 7.369 | (ASP) | 0.406 | | | | |
| 6 | Third lens | 18.679 | (ASP) | 0.350 | Plastic | 1.671 | 19.2 | −51.85 |
| 7 | | 12.103 | (ASP) | 0.200 | | | | |
| 8 | Fourth lens | 20.864 | (ASP) | 0.728 | Plastic | 1.545 | 56.0 | 15.76 |
| 9 | | −14.474 | (ASP) | 0.130 | | | | |
| 10 | Fifth lens | −17.288 | (ASP) | 0.400 | Plastic | 1.643 | 22.5 | −112.39 |
| 11 | | −22.880 | (ASP) | 0.406 | | | | |
| 12 | Sixth lens | 6.108 | (ASP) | 0.410 | Plastic | 1.588 | 28.4 | −14.33 |
| 13 | | 3.462 | (ASP) | 0.350 | | | | |
| 14 | Seventh lens | 2.849 | (ASP) | 0.587 | Plastic | 1.545 | 56.0 | 5.58 |
| 15 | | 40.084 | (ASP) | 1.026 | | | | |
| 16 | Eighth lens | −9.576 | (ASP) | 0.647 | Plastic | 1.545 | 56.0 | −4.65 |
| 17 | | 3.543 | (ASP) | 0.457 | | | | |
| 18 | Optical filter | Infinity | | 0.210 | Glass | 1.517 | 64.2 | |
| 19 | | Infinity | | 0.461 | | | | |
| 20 | Image plane | Infinity | | — | | | | |

The reference wavelength is 555 nm.

TABLE 2

Embodiment 1
Aspheric Coefficients

| Surface | 2 | 3 | 4 | 5 |
|---|---|---|---|---|
| K: | −5.4949E+00 | 1.4267E+01 | 4.1576E+01 | 6.7450E−01 |
| A2: | 0.0000E+00 | 0.0000E+00 | 0.0000E+00 | 0.0000E+00 |
| A4: | 3.0702E−02 | 6.2394E−03 | 1.3743E−02 | 1.5641E−02 |
| A6: | −1.3506E−02 | −1.6940E−02 | −3.3458E−02 | −3.0740E−02 |
| A8: | 1.1554E−02 | 8.4087E−03 | 1.8859E−02 | 2.5234E−02 |
| A10: | −7.0229E−03 | −2.2444E−03 | −1.1113E−03 | −1.2368E−02 |
| A12: | 2.1031E−03 | 2.4803E−03 | −2.8535E−03 | 4.2525E−03 |
| A14: | 7.3409E−05 | −2.4755E−03 | 1.0239E−03 | −9.5297E−04 |
| A16: | −2.5207E−04 | 1.1392E−03 | −1.9202E−05 | 4.0638E−05 |
| A18: | 6.8573E−05 | −2.4837E−04 | −4.3101E−05 | 4.4859E−05 |
| A20: | −6.1929E−06 | 2.1028E−05 | 5.3972E−06 | −7.9544E−06 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| Surface | 6 | 7 | 8 | 9 |
| K: | −9.9549E+01 | 1.2030E+01 | 9.9740E+01 | 3.7031E+01 |
| A2: | 0.0000E+00 | 0.0000E+00 | 0.0000E+00 | 0.0000E+00 |
| A4: | 7.8363E−03 | 1.2779E−02 | −8.1913E−03 | 2.4256E−03 |

TABLE 2-continued

Embodiment 1
Aspheric Coefficients

|      |              |              |              |              |
| ---- | ------------ | ------------ | ------------ | ------------ |
| A6:  | −2.5982E−02  | −3.0430E−02  | 1.3193E−02   | −3.9925E−02  |
| A8:  | 1.4062E−02   | 2.0991E−02   | −3.4649E−02  | 4.5841E−02   |
| A10: | −6.7721E−03  | −1.4290E−02  | 3.4225E−02   | −3.2623E−02  |
| A12: | 3.8418E−03   | 9.4289E−03   | −2.0154E−02  | 1.5462E−02   |
| A14: | −1.9226E−03  | −4.3444E−03  | 7.6936E−03   | −4.9497E−03  |
| A16: | 5.3957E−04   | 1.1881E−03   | −1.8602E−03  | 1.0295E−03   |
| A18: | −5.9939E−05  | −1.6999E−04  | 2.5692E−04   | −1.2519E−04  |
| A20: | 6.5640E−07   | 9.7151E−06   | −1.5265E−05  | 6.7181E−06   |
| A22: | 0.0000E+00   | 0.0000E+00   | 0.0000E+00   | 0.0000E+00   |
| A24: | 0.0000E+00   | 0.0000E+00   | 0.0000E+00   | 0.0000E+00   |
| A26: | 0.0000E+00   | 0.0000E+00   | 0.0000E+00   | 0.0000E+00   |
| A28: | 0.0000E+00   | 0.0000E+00   | 0.0000E+00   | 0.0000E+00   |

| Surface | 10 | 11 | 12 | 13 |
| --- | --- | --- | --- | --- |
| K:   | 3.2212E+01   | 1.3957E+01   | −1.5453E+00  | −7.8164E+00  |
| A2:  | 0.0000E+00   | 0.0000E+00   | 0.0000E+00   | 0.0000E+00   |
| A4:  | 2.4391E−02   | 3.2510E−02   | −2.2610E−02  | −6.8526E−02  |
| A6:  | −4.9029E−02  | −4.1902E−02  | 2.6213E−02   | 5.4094E−02   |
| A8:  | 3.4493E−02   | 2.1088E−02   | −2.3335E−02  | −3.0017E−02  |
| A10: | −9.4414E−03  | −4.1416E−03  | 1.0783E−02   | 1.0709E−02   |
| A12: | −7.2297E−04  | −4.5373E−04  | −2.9690E−03  | −2.4775E−03  |
| A14: | 1.1855E−03   | 3.9481E−04   | 4.8532E−04   | 3.6392E−04   |
| A16: | −3.2646E−04  | −8.0574E−05  | −4.5209E−05  | −3.2497E−05  |
| A18: | 4.0354E−05   | 7.3763E−06   | 2.0922E−06   | 1.6065E−06   |
| A20: | −1.9646E−06  | −2.5670E−07  | −3.0100E−08  | −3.3800E−08  |
| A22: | 0.0000E+00   | 0.0000E+00   | 0.0000E+00   | 0.0000E+00   |
| A24: | 0.0000E+00   | 0.0000E+00   | 0.0000E+00   | 0.0000E+00   |
| A26: | 0.0000E+00   | 0.0000E+00   | 0.0000E+00   | 0.0000E+00   |
| A28: | 0.0000E+00   | 0.0000E+00   | 0.0000E+00   | 0.0000E+00   |

| Surface | 14 | 15 | 16 | 17 |
| --- | --- | --- | --- | --- |
| K:   | −4.5733E+00  | 7.9535E+01   | 1.0939E+00   | −1.1655E+01  |
| A2:  | 0.0000E+00   | 0.0000E+00   | 0.0000E+00   | 0.0000E+00   |
| A4:  | −1.8757E−02  | 2.9533E−02   | −3.7221E−02  | −2.2139E−02  |
| A6:  | 1.2207E−03   | −2.1178E−02  | 5.1475E−03   | 3.7811E−03   |
| A8:  | −6.2915E−04  | 7.2953E−03   | 4.1597E−04   | −2.6225E−04  |
| A10: | 2.8685E−04   | −1.5402E−03  | −2.1318E−04  | −2.5953E−05  |
| A12: | −6.7021E−05  | 2.0770E−04   | 2.9228E−05   | 7.3215E−06   |
| A14: | 8.9908E−06   | −1.8186E−05  | −2.0793E−06  | −7.2170E−07  |
| A16: | −8.3350E−07  | 1.0062E−06   | 8.2000E−08   | 3.7800E−08   |
| A18: | 5.2600E−08   | −3.2000E−08  | −1.7000E−09  | −1.0000E−09  |
| A20: | −1.5000E−09  | 4.0000E−10   | 0.0000E+00   | 0.0000E+00   |
| A22: | 0.0000E+00   | 0.0000E+00   | 0.0000E+00   | 0.0000E+00   |
| A24: | 0.0000E+00   | 0.0000E+00   | 0.0000E+00   | 0.0000E+00   |
| A26: | 0.0000E+00   | 0.0000E+00   | 0.0000E+00   | 0.0000E+00   |
| A28: | 0.0000E+00   | 0.0000E+00   | 0.0000E+00   | 0.0000E+00   |

TABLE 3

Embodiment 1

| CRA[°]   | 37.16 | CA1[mm]    | 1.73 | CA16[mm]   | 4.56 |
| -------- | ----- | ---------- | ---- | ---------- | ---- |
| IMH[mm]  | 6.12  | TDP11[mm]  | 0.31 | TDP15[mm]  | 1.49 |

In Table 1, the units of the radius of curvature, the thickness, the gap and the focal length are expressed in mm, and the surface numbers 0-20 respectively represent the surfaces from the object-side to the image-side, wherein the surface 0 represents a gap between an object and the stop 100 along the optical axis 194; the surface 1 represents a gap between the stop 100 and the first lens 110 along the optical axis 194, the stop 100 is farther away from the object-side than the object-side surface 111 of the first lens 110, so the value is expressed as a negative value; the surface 2 represents the thickness of the first lens 110 along the optical axis 194; the surface 3 represents a gap between the first lens 110 and the second lens 120 along the optical axis 194; the surface 4 represents the thickness of the second lens 120 along the optical axis 194; the surface 5 represents a gap between the second lens 120 and the third lens 130 along the optical axis 194; the surface 6 represents the thickness of the third lens 130 along the optical axis 190; the surface 7 represents a gap between the third lens 130 and the fourth lens 140 along the optical axis 194; the surface 8 represents the thickness of the fourth lens 140 along the optical axis 194; the surface 9 represents a gap between the fourth lens 140 and the fifth lens 150 along the optical axis 194; the surface 10 represents the thickness of the fifth lens 150 along the optical axis 194; the surface 11 represents a gap between the fifth lens 150 and the sixth lens 160 along the optical axis 194; the surface 12 represents the thickness of the sixth lens 160 along the optical axis 194; the surface 13 represents a gap between the sixth lens 160 and the seventh lens 170 along the optical axis 194; the surface 14 represents the thickness of the seventh lens 170 along the optical axis 194; the surface 15 represents a gap between the seventh lens 170 and the eighth lens 180 along the optical axis 194; the surface 16 represents the thickness of the eighth lens 180 along the optical axis 194; the surface 17 represents a gap between the eighth lens 180 and the optical filter 191 along the optical axis 194; the surface 18 represents the thickness of the optical filter 191 along the optical axis 194; the surface 19 represents a gap between the optical filter 191 and the image plane 192 along the optical axis 194; and the surface 20 represents the image plane 192.

In table 2, k represents the conic constant of the equation of aspheric surface profiles, and A2, A4, A6, A8, A10, A12, A14, A16, A18, A20, A22, A24, A26, and A28 represent the high-order aspheric coefficients. The respective tables presented below for respective one of other embodiments are based on the schematic view of this embodiment, and the definitions of parameters in the tables are the same as those in Tables 1-3 of the first embodiment. Therefore, an explanation in this regard will not be provided again.

Second Embodiment

Figure 2A:
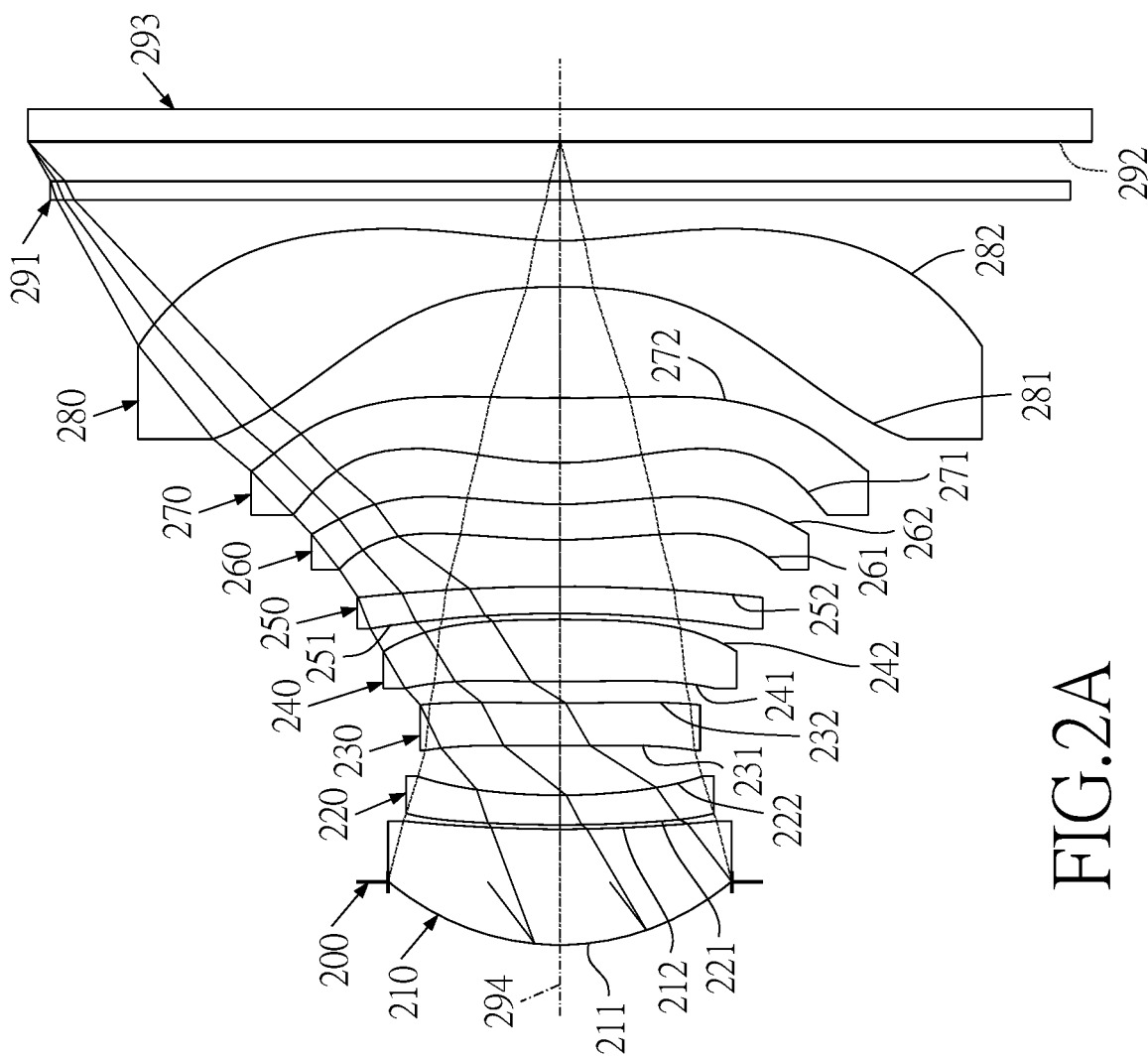
FIG. 2A is a schematic view of an optical lens assembly in accordance with a second embodiment of the present invention.
Figure 2B:
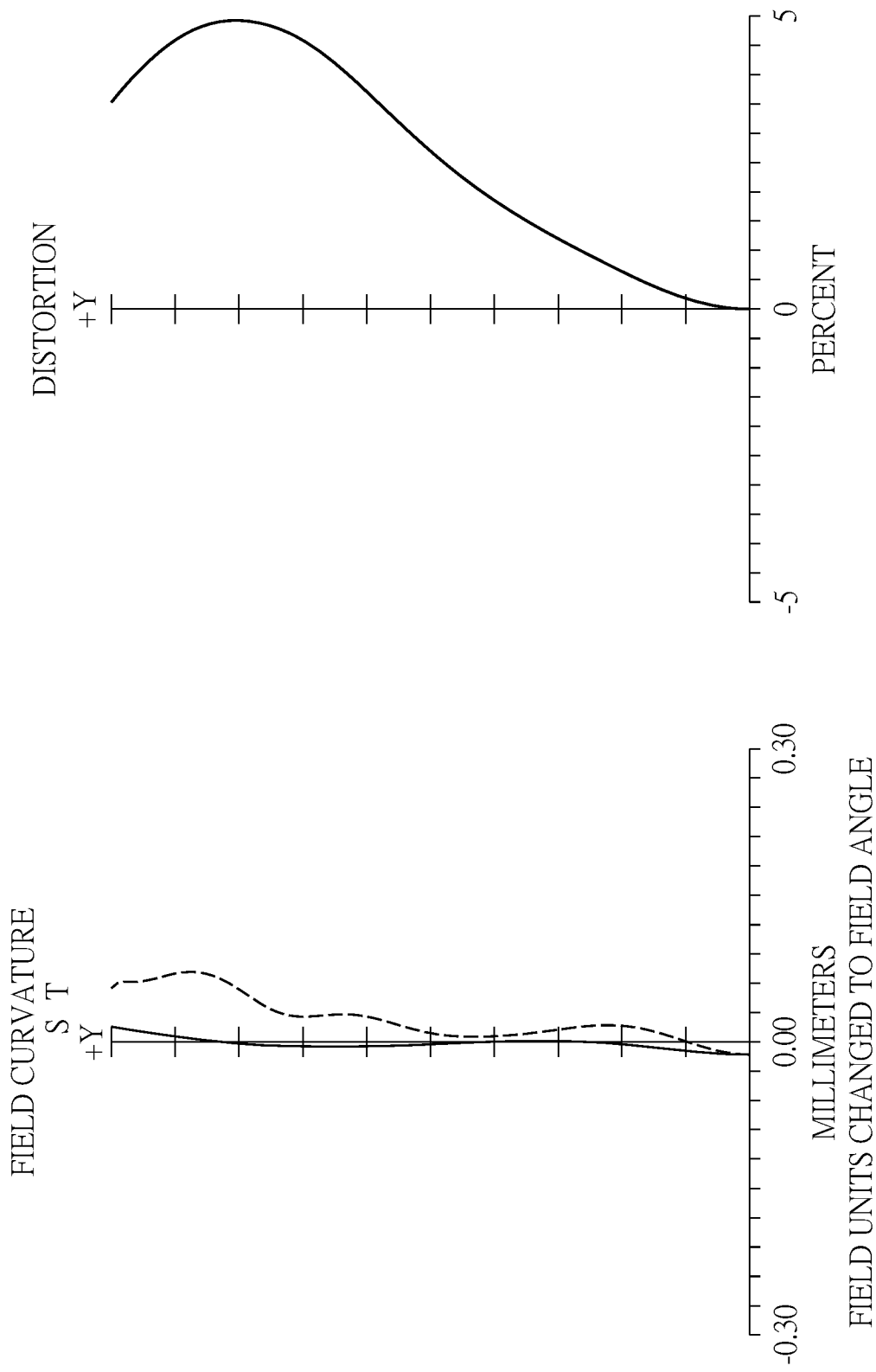
FIG. 2B is a schematic diagram showing, in order from left to right, the field curvature curve and the distortion curve of the second embodiment of the present invention.

Referring to FIGS. 2A and 2B, FIG. 2A shows a schematic view of an optical lens assembly in accordance with a second embodiment of the present invention, and FIG. 2B shows, in order from left to right, the field curvature curve and the distortion curve of the second embodiment of the present invention. As shown in FIG. 2A, the optical lens assembly includes, in order from an object side to an image side along an optical axis 294: a stop 200, a first lens 210, a second lens 220, a third lens 230, a fourth lens 240, a fifth lens 250, a sixth lens 260, a seventh lens 270, an eighth lens 280, an optical filter 291, and an image plane 292. The optical lens assembly can cooperate with an image sensor 293 disposed on the image plane 292. The optical lens assembly has a total of eight lenses with refractive power, but is not limited thereto.

The first lens 210 with positive refractive power includes an object-side surface 211 and an image-side surface 212, the object-side surface 211 of the first lens 210 is convex in a paraxial region thereof, the image-side surface 212 of the first lens 210 is concave in a paraxial region thereof, the object-side surface 211 and the image-side surface 212 of the first lens 210 are aspheric, and the first lens 210 is made of plastic.

The second lens 220 with negative refractive power includes an object-side surface 221 and an image-side surface 222, the object-side surface 221 of the second lens 220 is convex in a paraxial region thereof, the image-side surface 222 of the second lens 220 is concave in a paraxial region thereof, the object-side surface 221 and the image-side surface 222 of the second lens 220 are aspheric, and the second lens 220 is made of plastic.

The third lens 230 with negative refractive power includes an object-side surface 231 and an image-side surface 232, the object-side surface 231 of the third lens 230 is convex in a paraxial region thereof, the image-side surface 232 of the third lens 230 is concave in a paraxial region thereof, the object-side surface 231 and the image-side surface 232 of the third lens 230 are aspheric, and the third lens 230 is made of plastic.

The fourth lens 240 with positive refractive power includes an object-side surface 241 and an image-side surface 242, the object-side surface 241 of the fourth lens 240 is convex in a paraxial region thereof, the image-side surface 242 of the fourth lens 240 is convex in a paraxial region thereof, the object-side surface 241 and the image-side surface 242 of the fourth lens 240 are aspheric, and the fourth lens 240 is made of plastic.

The fifth lens 250 with negative refractive power includes an object-side surface 251 and an image-side surface 252, the object-side surface 251 of the fifth lens 250 is concave in a paraxial region thereof, the image-side surface 252 of the fifth lens 250 is convex in a paraxial region thereof, the object-side surface 251 and the image-side surface 252 of the fifth lens 250 are aspheric, and the fifth lens 250 is made of plastic.

The sixth lens 260 with negative refractive power includes an object-side surface 261 and an image-side surface 262, the object-side surface 261 of the sixth lens 260 is convex in a paraxial region thereof, the image-side surface 262 of the sixth lens 260 is concave in a paraxial region thereof, the object-side surface 261 and the image-side surface 262 of the sixth lens 260 are aspheric, and the sixth lens 260 is made of plastic.

The seventh lens 270 with positive refractive power includes an object-side surface 271 and an image-side surface 272, the object-side surface 271 of the seventh lens 270 is convex in a paraxial region thereof, the image-side surface 272 of the seventh lens 270 is concave in a paraxial region thereof, the object-side surface 271 and the image-side surface 272 of the seventh lens 270 are aspheric, and the seventh lens 270 is made of plastic.

The eighth lens 280 with negative refractive power includes an object-side surface 281 and an image-side surface 282, the object-side surface 281 of the eighth lens 280 is concave in a paraxial region thereof, the image-side surface 282 of the eighth lens 280 is concave in a paraxial region thereof, the object-side surface 281 and the image-side surface 282 of the eighth lens 280 are aspheric, and the eighth lens 280 is made of plastic.

The optical filter 291 is made of glass, is located between the eighth lens 280 and the image plane 292, and has no influence on the focal length of the optical lens assembly. In the present embodiment, the optical filter 291 is selected from IR-cut filters that allow visible light to pass therethrough.

Please refer to Tables 4-6. The detailed optical data of the respective elements in the optical lens assembly of the second embodiment is shown in Table 4, and the aspheric coefficients of the lenses in the second embodiment is shown in Table 5.

TABLE 4

Embodiment 2
f = 7.51 mm, Fno = 1.90, FOV = 76.17°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.701 | | | | |
| 2 | First lens | 3.108 | (ASP) | 1.295 | Plastic | 1.545 | 56.0 | 7.06 |
| 3 | | 13.678 | (ASP) | 0.049 | | | | |
| 4 | Second lens | 14.048 | (ASP) | 0.328 | Plastic | 1.671 | 19.2 | −22.71 |
| 5 | | 7.274 | (ASP) | 0.556 | | | | |
| 6 | Third lens | 50.628 | (ASP) | 0.479 | Plastic | 1.671 | 19.2 | −83.65 |

TABLE 4-continued

Embodiment 2
f = 7.51 mm, Fno = 1.90, FOV = 76.17°

| Surface | | Radius of curvature | | Thickness/gap | Material | Refractive index (nd) | Abbe number (vd) | Focal length |
|---|---|---|---|---|---|---|---|---|
| 7 | | 26.638 | (ASP) | 0.241 | | | | |
| 8 | Fourth lens | 30.964 | (ASP) | 0.698 | Plastic | 1.545 | 56.0 | 20.91 |
| 9 | | −17.954 | (ASP) | 0.066 | | | | |
| 10 | Fifth lens | −14.629 | (ASP) | 0.300 | Plastic | 1.643 | 22.5 | −63.60 |
| 11 | | −22.869 | (ASP) | 0.528 | | | | |
| 12 | Sixth lens | 6.997 | (ASP) | 0.398 | Plastic | 1.588 | 28.4 | −27.02 |
| 13 | | 4.764 | (ASP) | 0.465 | | | | |
| 14 | Seventh lens | 4.048 | (ASP) | 0.723 | Plastic | 1.545 | 56.0 | 8.24 |
| 15 | | 37.754 | (ASP) | 1.243 | | | | |
| 16 | Eighth lens | −8.925 | (ASP) | 0.520 | Plastic | 1.545 | 56.0 | −5.59 |
| 17 | | 4.740 | (ASP) | 0.458 | | | | |
| 18 | Optical filter | Infinity | | 0.210 | Glass | 1.517 | 64.2 | |
| 19 | | Infinity | | 0.440 | | | | |
| 20 | Image plane | Infinity | | — | | | | |

The reference wavelength is 555 nm.

TABLE 5

Embodiment 2
Aspheric Coefficients

| Surface | 2 | 3 | 4 | 5 |
|---|---|---|---|---|
| K: | −6.1257E+00 | 1.9198E+01 | 4.3982E+01 | 1.4801E+00 |
| A2: | 0.0000E+00 | 0.0000E+00 | 0.0000E+00 | 0.0000E+00 |
| A4: | 2.5196E−02 | −2.0040E−02 | −1.8945E−02 | 1.1830E−03 |
| A6: | −4.1362E−03 | 2.8839E−02 | 2.7767E−02 | −3.6971E−03 |
| A8: | −5.9056E−05 | −3.4083E−02 | −3.2265E−02 | 1.0961E−02 |
| A10: | 1.1032E−03 | 2.7046E−02 | 2.5351E−02 | −1.4369E−02 |
| A12: | −7.6165E−04 | −1.3841E−02 | −1.2792E−02 | 1.1045E−02 |
| A14: | 2.7770E−04 | 4.4413E−03 | 4.0367E−03 | −5.1468E−03 |
| A16: | −5.8729E−05 | −8.4194E−04 | −7.4346E−04 | 1.4412E−03 |
| A18: | 6.7649E−06 | 8.2962E−05 | 6.9345E−05 | −2.2124E−04 |
| A20: | −3.3100E−07 | −3.0519E−06 | −2.2616E−06 | 1.4279E−05 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 6 | 7 | 8 | 9 |
|---|---|---|---|---|
| K: | −9.9800E+01 | −2.4286E+01 | 8.3681E+01 | 1.9817E+01 |
| A2: | 0.0000E+00 | 0.0000E+00 | 0.0000E+00 | 0.0000E+00 |
| A4: | −5.3277E−03 | −3.9841E−03 | −5.4185E−03 | −4.2808E−03 |
| A6: | −1.0905E−02 | −8.9826E−03 | −6.7819E−03 | −9.2917E−03 |
| A8: | 1.2618E−02 | 6.5006E−03 | 3.0602E−03 | 7.3702E−03 |
| A10: | −1.1323E−02 | −3.6574E−03 | −1.5455E−03 | −5.4140E−03 |
| A12: | 6.7344E−03 | 1.5602E−03 | 6.4465E−04 | 2.7670E−03 |
| A14: | −2.5842E−03 | −4.2576E−04 | −1.1627E−04 | −8.7334E−04 |
| A16: | 6.1709E−04 | 6.9495E−05 | −5.8352E−06 | 1.6239E−04 |
| A18: | −8.1849E−05 | −5.6309E−06 | 4.6958E−06 | −1.6418E−05 |
| A20: | 4.5530E−06 | 1.2520E−07 | −4.2880E−07 | 7.0290E−07 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | | |

| Surface | 10 | 11 | 12 | 13 |
|---|---|---|---|---|
| K: | 4.5197E+00 | 4.0236E+00 | 3.6757E+00 | −8.8045E+00 |
| A2: | 0.0000E+00 | 0.0000E+00 | 0.0000E+00 | 0.0000E+00 |
| A4: | 5.2464E−03 | 5.4409E−03 | −3.1227E−02 | −4.7405E−02 |
| A6: | −6.3054E−03 | −6.5523E−03 | 1.3128E−02 | 2.2419E−02 |
| A8: | 2.5012E−03 | 3.2508E−03 | −6.2827E−03 | −9.0958E−03 |
| A10: | −2.2887E−04 | −8.8308E−04 | 1.7468E−03 | 2.6604E−03 |
| A12: | −8.8216E−05 | 1.3891E−04 | −2.9348E−04 | −5.7211E−04 |
| A14: | 2.3004E−05 | −1.2025E−05 | 1.9148E−05 | 8.5699E−05 |
| A16: | −1.5711E−06 | 4.5350E−07 | 2.4008E−06 | −8.1779E−06 |
| A18: | 0.0000E+00 | 0.0000E+00 | −5.1660E−07 | 4.3990E−07 |
| A20: | 0.0000E+00 | 0.0000E+00 | 2.6300E−08 | −1.0100E−08 |
| A22: | 0.0000E+00 | 0.0000E+00 | 0.0000E+00 | 0.0000E+00 |

TABLE 5-continued

Embodiment 2
Aspheric Coefficients

| A24: | 0.0000E+00 | 0.0000E+00 | 0.0000E+00 | 0.0000E+00 |
|---|---|---|---|---|
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| K: | 14 | 15 | 16 | 17 |
|---|---|---|---|---|
| A2: | −5.1901E+00 | 8.7256E+01 | 1.3642E+00 | −1.5361E+01 |
| A4: | 0.0000E+00 | 0.0000E+00 | 0.0000E+00 | 0.0000E+00 |
| A6: | −1.9515E−02 | 5.1161E−03 | −3.0538E−02 | −1.9009E−02 |
| A8: | 9.5187E−04 | −6.6624E−03 | 6.1590E−03 | 3.6588E−03 |
| A10: | −5.8089E−04 | 1.5722E−03 | −9.7628E−04 | −5.0649E−04 |
| A12: | 3.0649E−04 | −2.1188E−04 | 1.4250E−04 | 5.1009E−05 |
| A14: | −7.9810E−05 | 2.1270E−05 | −1.6070E−05 | −3.7804E−06 |
| A16: | 1.1916E−05 | −2.0148E−06 | 1.2325E−06 | 1.9590E−07 |
| A18: | −1.0896E−06 | 1.5510E−07 | −5.9000E−08 | −6.6000E−09 |
| A20: | 5.6900E−08 | −7.0000E−09 | 1.6000E−09 | 1.0000E−10 |
| A22: | −1.3000E−09 | 1.0000E−10 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |
| K: | 0.0000E+00 | 0.0000E+00 | 0.0000E+00 | 0.0000E+00 |

TABLE 6

Embodiment 2

| CRA[°] | 36.57 | CA1[mm] | 1.98 | CA16[mm] | 4.85 |
|---|---|---|---|---|---|
| IMH[mm] | 6.12 | TDP11[mm] | 0.34 | TDP15[mm] | 1.70 |

In the second embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 4-6 as the following values, and the following conditions in Table 7 are satisfied.

TABLE 7

Embodiment 2

| (vd7 + vd8)/(vd3 + vd5) | 2.68 | TL*TDP15/TDP11[mm] | 45.65 |
|---|---|---|---|
| tan(HFOV)*TL/ImH | 1.15 | CRA*CA16/ImH[°] | 29.03 |
| f1/R11 | 1.01 | EPD*(CA16/CA1)[mm] | 9.71 |
| f3*(FOV/CRA)[mm] | −174.20 | f5/f6 | 2.35 |
| f/f4 | 0.36 | R7/R13 | 7.65 |
| f3/f8 + f4/f7 | 17.50 | f2*(R1/R12)[mm] | −14.81 |
| CRA*BFL/TDP15[°] | 23.81 | R2/R14 | 0.36 |

Third Embodiment

Figure 3A:
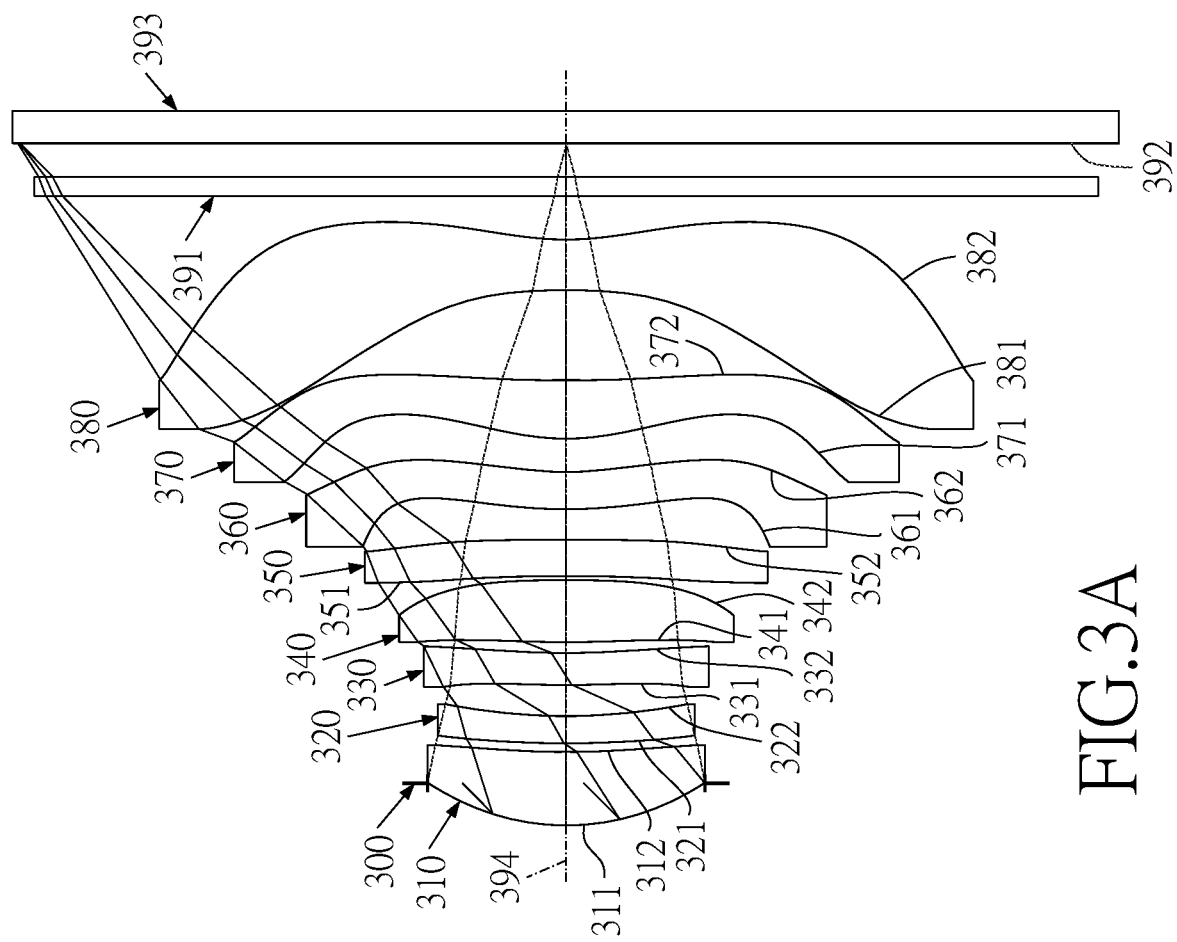
FIG. 3A is a schematic view of an optical lens assembly in accordance with a third embodiment of the present invention.
Figure 3B:
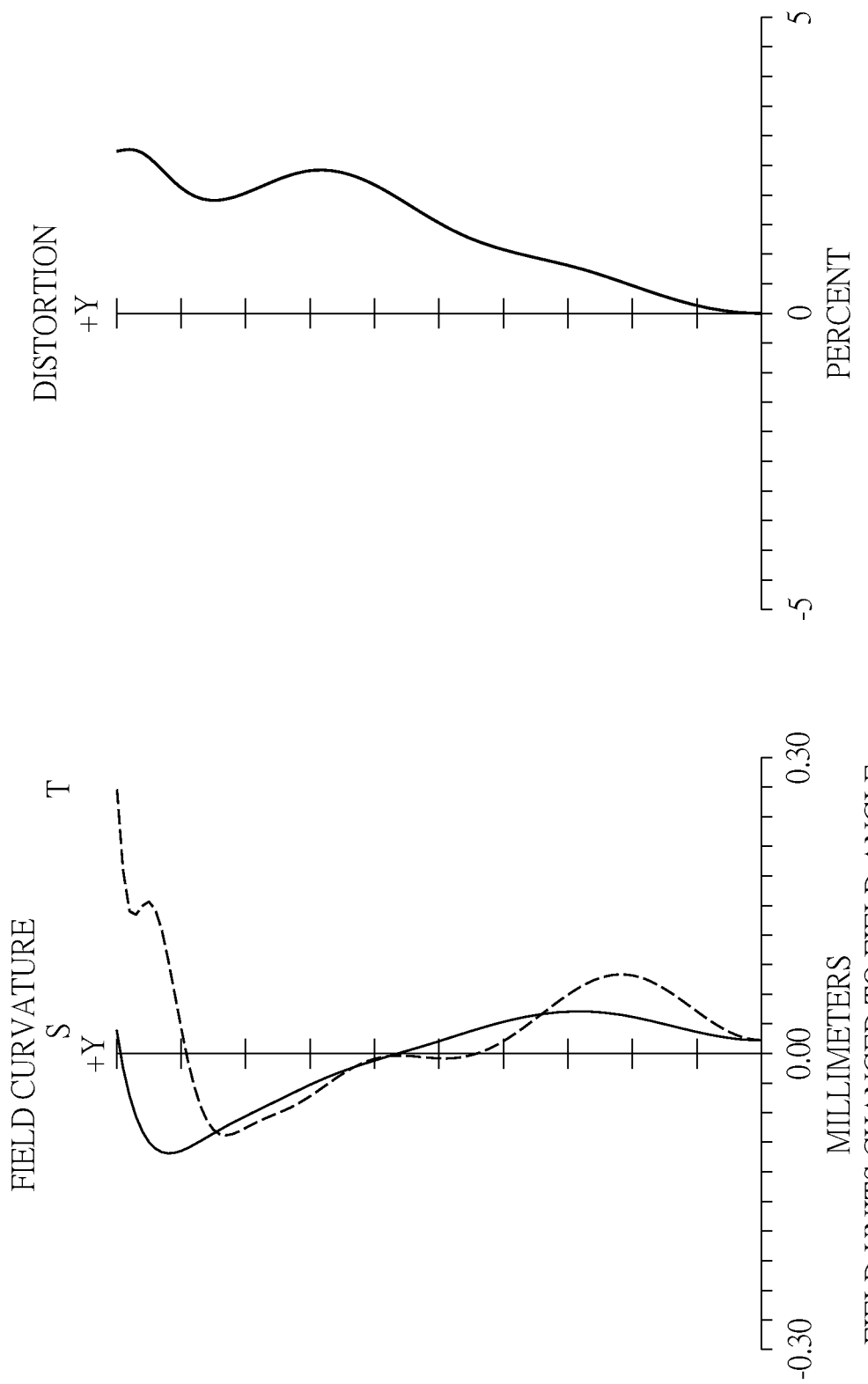
FIG. 3B is a schematic diagram showing, in order from left to right, the field curvature curve and the distortion curve of the third embodiment of the present invention.

Referring to FIGS. 3A and 3B, FIG. 3A shows a schematic view of an optical lens assembly in accordance with a third embodiment of the present invention, and FIG. 3B shows, in order from left to right, the field curvature curve and the distortion curve of the third embodiment of the present invention. As shown in FIG. 3A, the optical lens assembly includes, in order from an object side to an image side along an optical axis 394: a stop 300, a first lens 310, a second lens 320, a third lens 330, a fourth lens 340, a fifth lens 350, a sixth lens 360, a seventh lens 370, an eighth lens 380, an optical filter 391, and an image plane 392. The optical lens assembly can cooperate with an image sensor 393 disposed on the image plane 392. The optical lens assembly has a total of eight lenses with refractive power, but is not limited thereto.

The first lens 310 with positive refractive power includes an object-side surface 311 and an image-side surface 312, the object-side surface 311 of the first lens 310 is convex in a paraxial region thereof, the image-side surface 312 of the first lens 310 is concave in a paraxial region thereof, the object-side surface 311 and the image-side surface 312 of the first lens 310 are aspheric, and the first lens 310 is made of plastic.

The second lens 320 with negative refractive power includes an object-side surface 321 and an image-side surface 322, the object-side surface 321 of the second lens 320 is convex in a paraxial region thereof, the image-side surface 322 of the second lens 320 is concave in a paraxial region thereof, the object-side surface 321 and the image-side surface 322 of the second lens 320 are aspheric, and the second lens 320 is made of plastic.

The third lens 330 with negative refractive power includes an object-side surface 331 and an image-side surface 332, the object-side surface 331 of the third lens 330 is convex in a paraxial region thereof, the image-side surface 332 of the third lens 330 is concave in a paraxial region thereof, the object-side surface 331 and the image-side surface 332 of the third lens 330 are aspheric, and the third lens 330 is made of plastic.

The fourth lens 340 with positive refractive power includes an object-side surface 341 and an image-side surface 342, the object-side surface 341 of the fourth lens 340 is convex in a paraxial region thereof, the image-side surface 342 of the fourth lens 340 is convex in a paraxial region thereof, the object-side surface 341 and the image-side surface 342 of the fourth lens 340 are aspheric, and the fourth lens 340 is made of plastic.

The fifth lens 350 with negative refractive power includes an object-side surface 351 and an image-side surface 352, the object-side surface 351 of the fifth lens 350 is concave in a paraxial region thereof, the image-side surface 352 of the fifth lens 350 is convex in a paraxial region thereof, the object-side surface 351 and the image-side surface 352 of the fifth lens 350 are aspheric, and the fifth lens 350 is made of plastic.

The sixth lens 360 with negative refractive power includes an object-side surface 361 and an image-side surface 362, the object-side surface 361 of the sixth lens 360 is convex in a paraxial region thereof, the image-side surface 362 of the sixth lens 360 is concave in a paraxial region thereof, the object-side surface 361 and the image-side surface 362 of the sixth lens 360 are aspheric, and the sixth lens 360 is made of plastic.

The seventh lens 370 with positive refractive power includes an object-side surface 371 and an image-side surface 372, the object-side surface 371 of the seventh lens 370 is convex in a paraxial region thereof, the image-side surface 372 of the seventh lens 370 is concave in a paraxial region thereof, the object-side surface 371 and the image-side surface 372 of the seventh lens 370 are aspheric, and the seventh lens 370 is made of plastic.

The eighth lens 380 with negative refractive power includes an object-side surface 381 and an image-side surface 382, the object-side surface 381 of the eighth lens 380 is concave in a paraxial region thereof, the image-side surface 382 of the eighth lens 380 is concave in a paraxial region thereof, the object-side surface 381 and the image-side surface 382 of the eighth lens 380 are aspheric, and the eighth lens 380 is made of plastic.

The optical filter 391 is made of glass, is located between the eighth lens 380 and the image plane 392, and has no influence on the focal length of the optical lens assembly. In the present embodiment, the optical filter 391 is selected from IR-cut filters that allow visible light to pass therethrough.

Please refer to Tables 8-10. The detailed optical data of the respective elements in the optical lens assembly of the third embodiment is shown in Table 8, and the aspheric coefficients of the lenses in the third embodiment is shown in Table 9.

TABLE 8

Embodiment 3 f = 5.85 mm, Fno = 1.89, FOV = 91.27°

| Surface | | Radius of curvature | | Thickness/ gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.457 | | | | |
| 2 | First lens | 2.803 | (ASP) | 0.797 | Plastic | 1.545 | 56.0 | 6.69 |
| 3 | | 10.830 | (ASP) | 0.096 | | | | |
| 4 | Second lens | 12.494 | (ASP) | 0.293 | Plastic | 1.671 | 19.2 | −25.62 |
| 5 | | 7.196 | (ASP) | 0.346 | | | | |
| 6 | Third lens | 20.346 | (ASP) | 0.346 | Plastic | 1.671 | 19.2 | −41.03 |
| 7 | | 11.667 | (ASP) | 0.119 | | | | |
| 8 | Fourth lens | 18.956 | (ASP) | 0.672 | Plastic | 1.545 | 56.0 | 15.26 |
| 9 | | −14.691 | (ASP) | 0.048 | | | | |
| 10 | Fifth lens | −18.830 | (ASP) | 0.396 | Plastic | 1.643 | 22.5 | −110.54 |
| 11 | | −25.762 | (ASP) | 0.329 | | | | |
| 12 | Sixth lens | 5.372 | (ASP) | 0.408 | Plastic | 1.588 | 28.4 | −17.47 |
| 13 | | 3.435 | (ASP) | 0.361 | | | | |
| 14 | Seventh lens | 2.743 | (ASP) | 0.641 | Plastic | 1.545 | 56.0 | 5.26 |
| 15 | | 55.063 | (ASP) | 0.979 | | | | |
| 16 | Eighth lens | −8.968 | (ASP) | 0.550 | Plastic | 1.545 | 56.0 | −4.36 |
| 17 | | 3.311 | (ASP) | 0.478 | | | | |
| 18 | Optical filter | Infinity | | 0.210 | Glass | 1.517 | 64.2 | |
| 19 | | Infinity | | 0.361 | | | | |
| 20 | Image plane | Infinity | | — | | | | |

The reference wavelength is 555 nm.

TABLE 9

Embodiment 3
Aspheric Coefficients

| Surface | 2 | 3 | 4 | 5 |
|---|---|---|---|---|
| K: | −4.9785E+00 | 8.9597E+00 | 4.0995E+01 | 2.4332E+00 |
| A2: | 0.0000E+00 | 0.0000E+00 | 0.0000E+00 | 0.0000E+00 |
| A4: | 3.1821E−02 | 5.5758E−03 | 1.3922E−02 | 1.6466E−02 |
| A6: | −1.3400E−02 | −1.7386E−02 | −3.3154E−02 | −3.0826E−02 |
| A8: | 1.1512E−02 | 8.3632E−03 | 1.8912E−02 | 2.5165E−02 |
| A10: | −7.0405E−03 | −2.2458E−03 | −1.1022E−03 | −1.2389E−02 |
| A12: | 2.0987E−03 | 2.4804E−03 | −2.8501E−03 | 4.2455E−03 |
| A14: | 7.2353E−05 | −2.4756E−03 | 1.0249E−03 | −9.5558E−04 |
| A16: | −2.5236E−04 | 1.1392E−03 | −1.8929E−05 | 3.9646E−05 |
| A18: | 6.8486E−05 | −2.4829E−04 | −4.3058E−05 | 4.4533E−05 |
| A20: | −6.2197E−06 | 2.1097E−05 | 5.3885E−06 | −8.0411E−06 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 6 | 7 | 8 | 9 |
|---|---|---|---|---|
| K: | −1.6371E+02 | 2.0047E+01 | 8.5424E+01 | 4.1279E+01 |
| A2: | 0.0000E+00 | 0.0000E+00 | 0.0000E+00 | 0.0000E+00 |
| A4: | 6.1681E−03 | 1.3708E−02 | −5.6107E−03 | −4.5861E−04 |
| A6: | −2.6714E−02 | −3.0160E−02 | 1.2966E−02 | −3.9808E−02 |
| A8: | 1.4006E−02 | 2.0974E−02 | −3.4597E−02 | 4.5865E−02 |
| A10: | −6.7881E−03 | −1.4274E−02 | 3.4220E−02 | −3.2623E−02 |
| A12: | 3.8341E−03 | 9.4373E−03 | −2.0162E−02 | 1.5461E−02 |
| A14: | −1.9245E−03 | −4.3424E−03 | 7.6914E−03 | −4.9501E−03 |
| A16: | 5.3956E−04 | 1.1884E−03 | −1.8606E−03 | 1.0294E−03 |
| A18: | −5.9681E−05 | −1.7000E−04 | 2.5693E−04 | −1.2524E−04 |
| A20: | 8.4260E−07 | 9.6982E−06 | −1.5233E−05 | 6.7044E−06 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 10 | 11 | 12 | 13 |
|---|---|---|---|---|
| K: | 1.1020E+01 | 6.4490E+01 | −5.7032E+00 | −1.0862E+01 |
| A2: | 0.0000E+00 | 0.0000E+00 | 0.0000E+00 | 0.0000E+00 |
| A4 | 2.5035E−02 | 3.1601E−02 | −2.4535E−02 | −6.8016E−02 |
| A6: | −4.9037E−02 | −4.1910E−02 | 2.6292E−02 | 5.4069E−02 |
| A8: | 3.4531E−02 | 2.1084E−02 | −2.3313E−02 | −3.0018E−02 |
| A10: | −9.4307E−03 | −4.1396E−03 | 1.0772E−02 | 1.0709E−02 |
| A12: | −7.2127E−04 | −4.5275E−04 | −2.9718E−03 | −2.4775E−03 |
| A14: | 1.1857E−03 | 3.9497E−04 | 4.8484E−04 | 3.6391E−04 |
| A16: | −3.2647E−04 | −8.0561E−05 | −4.5279E−05 | −3.2497E−05 |
| A18: | 4.0346E−05 | 7.3734E−06 | 2.0837E−06 | 1.6065E−06 |
| A20: | −1.9681E−06 | −2.5830E−07 | −3.0900E−08 | −3.3800E−08 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 14 | 15 | 16 | 17 |
|---|---|---|---|---|
| K: | −5.2610E+00 | 5.8111E+01 | 8.1729E−01 | −1.1345E+01 |
| A2: | 0.0000E+00 | 0.0000E+00 | 0.0000E+00 | 0.0000E+00 |
| A4: | −1.9088E−02 | 2.9910E−02 | −3.7129E−02 | −2.2101E−02 |
| A6: | 1.2865E−03 | −2.1195E−02 | 5.1537E−03 | 3.7439E−03 |
| A8: | −6.2826E−04 | 7.2943E−03 | 4.1606E−04 | −2.6304E−04 |
| A10: | 2.8675E−04 | −1.5403E−03 | −2.1319E−04 | −2.5956E−05 |
| A12: | −6.7025E−05 | 2.0770E−04 | 2.9227E−05 | 7.3223E−06 |
| A14: | 8.9921E−06 | −1.8186E−05 | −2.0793E−06 | −7.2160E−07 |
| A16: | −8.3340E−07 | 1.0062E−06 | 8.2000E−08 | 3.7800E−08 |
| A18: | 5.2600E−08 | −3.2000E−08 | −1.7000E−09 | −1.0000E−09 |
| A20: | −1.5000E−09 | 4.0000E−10 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

TABLE 10

Embodiment 3

| CRA[°] | 38.48 | CA1[mm] | 1.55 | CA16[mm] | 4.55 |
|---|---|---|---|---|---|
| IMH[mm] | 6.12 | TDP11[mm] | 0.41 | TDP15[mm] | 1.52 |

In the third embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 8-10 as the following values, and the following conditions in Table 11 are satisfied.

TABLE 11

Embodiment 3

| (vd7 + vd8)/(vd3 + vd5) | 2.68 | TL*TDP15/TDP11[mm] | 27.49 |
|---|---|---|---|
| tan(HFOV)*TL/ImH | 1.24 | CRA*CA16/ImH[°] | 28.64 |
| f1/R11 | 1.24 | EPD*(CA16/CA1)[mm] | 9.10 |
| f3*(FOV/CRA)[mm] | −97.30 | f5/f6 | 6.33 |
| f/f4 | 0.38 | R7/R13 | 6.91 |
| f3/f8 + f4/f7 | 12.31 | f2*(R1/R12)[mm] | −20.91 |
| CRA*BFL/TDP15[°] | 26.61 | R2/R14 | 0.20 |

Fourth Embodiment

Figure 4B:
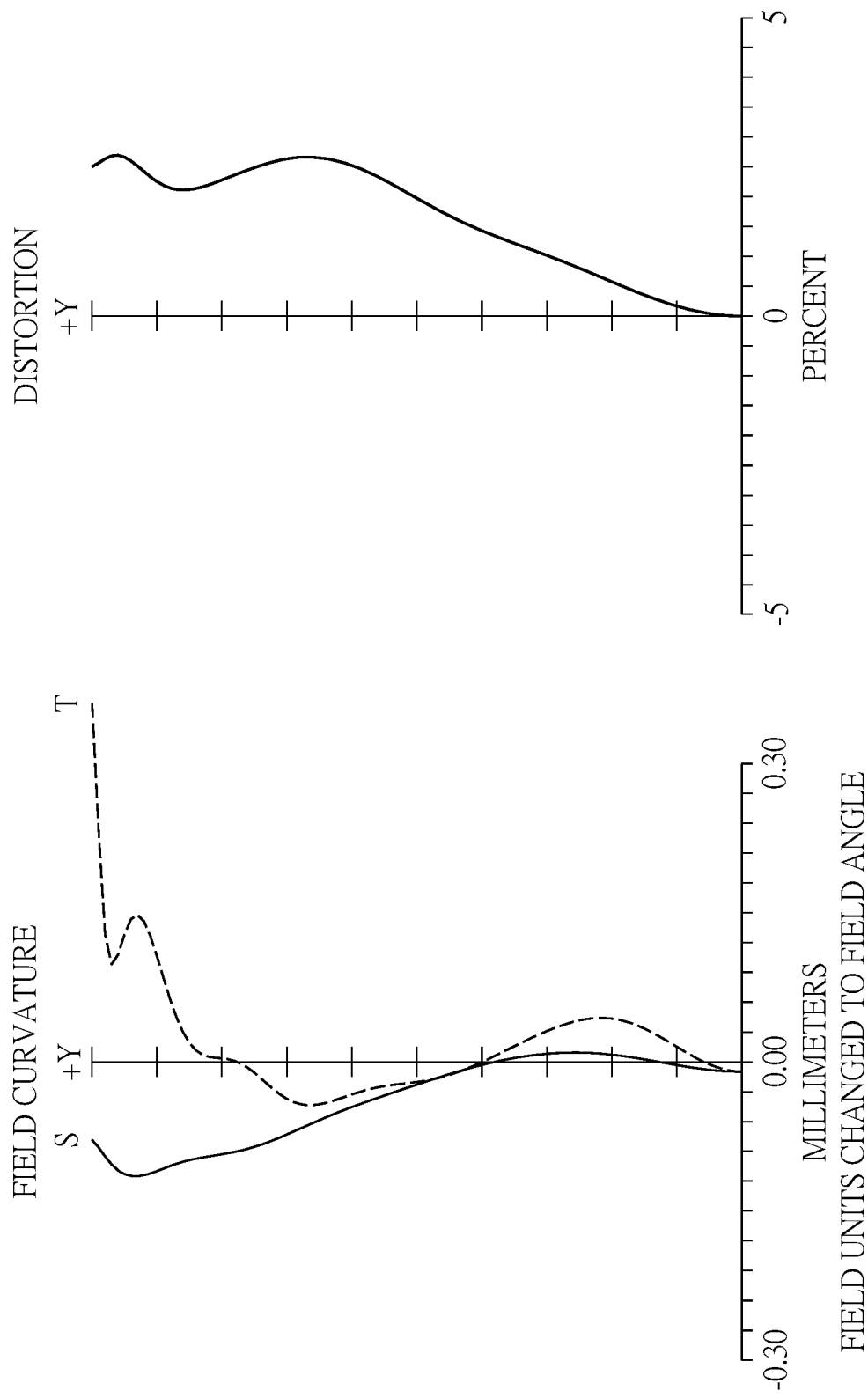
FIG. 4B is a schematic diagram showing, in order from left to right, the field curvature curve and the distortion curve of the fourth embodiment of the present invention.

Referring to FIGS. 4A and 4B, FIG. 4A shows a schematic view of an optical lens assembly in accordance with a fourth embodiment of the present invention, and FIG. 4B shows, in order from left to right, the field curvature curve and the distortion curve of the fourth embodiment of the present invention. As shown in FIG. 4A, the optical lens assembly includes, in order from an object side to an image side along an optical axis 494: a stop 400, a first lens 410, a second lens 420, a third lens 430, a fourth lens 440, a fifth lens 450, a sixth lens 460, a seventh lens 470, an eighth lens 480, an optical filter 491, and an image plane 492. The optical lens assembly can cooperate with an image sensor 493 disposed on the image plane 492. The optical lens assembly has a total of eight lenses with refractive power, but is not limited thereto.

The first lens 410 with positive refractive power includes an object-side surface 411 and an image-side surface 412, the object-side surface 411 of the first lens 410 is convex in a paraxial region thereof, the image-side surface 412 of the first lens 410 is concave in a paraxial region thereof, the object-side surface 411 and the image-side surface 412 of the first lens 410 are aspheric, and the first lens 410 is made of plastic.

The second lens 420 with negative refractive power includes an object-side surface 421 and an image-side surface 422, the object-side surface 421 of the second lens 420 is convex in a paraxial region thereof, the image-side surface 422 of the second lens 420 is concave in a paraxial region thereof, the object-side surface 421 and the image-side surface 422 of the second lens 420 are aspheric, and the second lens 420 is made of plastic.

The third lens 430 with negative refractive power includes an object-side surface 431 and an image-side surface 432, the object-side surface 431 of the third lens 430 is convex in a paraxial region thereof, the image-side surface 432 of the third lens 430 is concave in a paraxial region thereof, the object-side surface 431 and the image-side surface 432 of the third lens 430 are aspheric, and the third lens 430 is made of plastic.

The fourth lens 440 with positive refractive power includes an object-side surface 441 and an image-side surface 442, the object-side surface 441 of the fourth lens 440 is convex in a paraxial region thereof, the image-side surface 442 of the fourth lens 440 is convex in a paraxial region thereof, the object-side surface 441 and the image-side surface 442 of the fourth lens 440 are aspheric, and the fourth lens 440 is made of plastic.

The fifth lens 450 with negative refractive power includes an object-side surface 451 and an image-side surface 452, the object-side surface 451 of the fifth lens 450 is concave in a paraxial region thereof, the image-side surface 452 of the fifth lens 450 is convex in a paraxial region thereof, the object-side surface 451 and the image-side surface 452 of the fifth lens 450 are aspheric, and the fifth lens 450 is made of plastic.

The sixth lens 460 with negative refractive power includes an object-side surface 461 and an image-side surface 462, the object-side surface 461 of the sixth lens 460 is convex in a paraxial region thereof, the image-side surface 462 of the sixth lens 460 is concave in a paraxial region thereof, the object-side surface 461 and the image-side surface 462 of the sixth lens 460 are aspheric, and the sixth lens 460 is made of plastic.

The seventh lens 470 with positive refractive power includes an object-side surface 471 and an image-side surface 472, the object-side surface 471 of the seventh lens 470 is convex in a paraxial region thereof, the image-side surface 472 of the seventh lens 470 is convex in a paraxial region thereof, the object-side surface 471 and the image-side surface 472 of the seventh lens 470 are aspheric, and the seventh lens 470 is made of plastic.

The eighth lens 480 with negative refractive power includes an object-side surface 481 and an image-side surface 482, the object-side surface 481 of the eighth lens 480 is concave in a paraxial region thereof, the image-side surface 482 of the eighth lens 480 is concave in a paraxial region thereof, the object-side surface 481 and the image-side surface 482 of the eighth lens 480 are aspheric, and the eighth lens 480 is made of plastic.

The optical filter 491 is made of glass, is located between the eighth lens 480 and the image plane 492, and has no influence on the focal length of the optical lens assembly. In the present embodiment, the optical filter 491 is selected from IR-cut filters that allow visible light to pass therethrough.

Please refer to Tables 12-14. The detailed optical data of the respective elements in the optical lens assembly of the fourth embodiment is shown in Table 12, and the aspheric coefficients of the lenses in the fourth embodiment is shown in Table 13.

TABLE 12

Embodiment 4 f = 5.95 mm, Fno = 1.67, FOV = 89.86°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | Stop | Infinity | | −0.615 | | | | |
| 2 | First lens | 2.888 | (ASP) | 0.866 | Plastic | 1.545 | 56.0 | 6.97 |
| 3 | | 10.691 | (ASP) | 0.093 | | | | |
| 4 | Second lens | 12.438 | (ASP) | 0.295 | Plastic | 1.671 | 19.2 | −27.44 |
| 5 | | 7.381 | (ASP) | 0.372 | | | | |
| 6 | Third lens | 16.126 | (ASP) | 0.347 | Plastic | 1.671 | 19.2 | −68.49 |
| 7 | | 11.864 | (ASP) | 0.164 | | | | |
| 8 | Fourth lens | 19.537 | (ASP) | 0.785 | Plastic | 1.545 | 56.0 | 16.09 |
| 9 | | −15.748 | (ASP) | 0.091 | | | | |
| 10 | Fifth lens | −12.129 | (ASP) | 0.399 | Plastic | 1.643 | 22.5 | −44.74 |
| 11 | | −21.132 | (ASP) | 0.287 | | | | |
| 12 | Sixth lens | 5.077 | (ASP) | 0.417 | Plastic | 1.588 | 28.4 | −12.61 |
| 13 | | 2.929 | (ASP) | 0.260 | | | | |
| 14 | Seventh lens | 2.605 | (ASP) | 0.736 | Plastic | 1.545 | 56.0 | 4.65 |
| 15 | | −89.204 | (ASP) | 1.044 | | | | |
| 16 | Eighth lens | −8.231 | (ASP) | 0.556 | Plastic | 1.545 | 56.0 | −4.63 |
| 17 | | 3.743 | (ASP) | 0.351 | | | | |
| 18 | Optical filter | Infinity | | 0.210 | Glass | 1.517 | 64.2 | |
| 19 | | Infinity | | 0.461 | | | | |
| 20 | Image plane | Infinity | | — | | | | |

The reference wavelength is 555 nm.

TABLE 13

Embodiment 4
Aspheric Coefficients

| Surface | 2 | 3 | 4 | 5 |
|---|---|---|---|---|
| K: | −5.4144E+00 | 1.1347E+01 | 4.1565E+01 | 1.9430E+00 |
| A2: | 0.0000E+00 | 0.0000E+00 | 0.0000E+00 | 0.0000E+00 |
| A4: | 3.1539E−02 | 5.8744E−03 | 1.3102E−02 | 1.6078E−02 |
| A6: | −1.3276E−02 | −1.7286E−02 | −3.3441E−02 | −3.0764E−02 |
| A8: | 1.1583E−02 | 8.4997E−03 | 1.8816E−02 | 2.5164E−02 |
| A10: | −7.0189E−03 | −2.2091E−03 | −1.1171E−03 | −1.2397E−02 |
| A12: | 2.1032E−03 | 2.4873E−03 | −2.8513E−03 | 4.2421E−03 |
| A14: | 7.3105E−05 | −2.4747E−03 | 1.0251E−03 | −9.5621E−04 |
| A16: | −2.5216E−04 | 1.1393E−03 | −1.8883E−05 | 3.9911E−05 |
| A18: | 6.8599E−05 | −2.4835E−04 | −4.3062E−05 | 4.4879E−05 |
| A20: | −6.1409E−06 | 2.1056E−05 | 5.3771E−06 | −7.8099E−06 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 6 | 7 | 8 | 9 |
|---|---|---|---|---|
| K: | −3.9387E+01 | 1.7047E+01 | 8.6152E+01 | 4.3719E+01 |
| A2: | 0.0000E+00 | 0.0000E+00 | 0.0000E+00 | 0.0000E+00 |
| A4: | 6.7637E−03 | 1.3493E−02 | −4.2460E−03 | −7.3446E−04 |
| A6: | −2.6504E−02 | −3.0329E−02 | 1.2703E−02 | −3.9692E−02 |
| A8: | 1.4123E−02 | 2.0879E−02 | −3.4460E−02 | 4.5891E−02 |
| A10: | −6.7490E−03 | −1.4288E−02 | 3.4249E−02 | −3.2627E−02 |
| A12: | 3.8431E−03 | 9.4370E−03 | −2.0164E−02 | 1.5461E−02 |
| A14: | −1.9233E−03 | −4.3419E−03 | 7.6890E−03 | −4.9496E−03 |
| A16: | 5.3945E−04 | 1.1885E−03 | −1.8612E−03 | 1.0295E−03 |
| A18: | −5.9856E−05 | −1.6997E−04 | 2.5693E−04 | −1.2521E−04 |
| A20: | 7.4220E−07 | 9.7088E−06 | −1.5158E−05 | 6.6968E−06 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 10 | 11 | 12 | 13 |
|---|---|---|---|---|
| K: | 2.7051E+01 | 7.3095E+01 | −7.7767E+00 | −1.0821E+01 |
| A2: | 0.0000E+00 | 0.0000E+00 | 0.0000E+00 | 0.0000E+00 |
| A4: | 2.3130E−02 | 3.0880E−02 | −2.2194E−02 | −6.7149E−02 |
| A6: | −4.9253E−02 | −4.2014E−02 | 2.7051E−02 | 5.4040E−02 |
| A8: | 3.4517E−02 | 2.1053E−02 | −2.3360E−02 | −3.0021E−02 |
| A10: | −9.4288E−03 | −4.1460E−03 | 1.0763E−02 | 1.0709E−02 |
| A12: | −7.2124E−04 | −4.5341E−04 | −2.9707E−03 | −2.4775E−03 |
| A14: | 1.1855E−03 | 3.9500E−04 | 4.8533E−04 | 3.6392E−04 |
| A16: | −3.2652E−04 | −8.0544E−05 | −4.5191E−05 | −3.2496E−05 |
| A18: | 4.0340E−05 | 7.3747E−06 | 2.0945E−06 | 1.6066E−06 |
| A20: | −1.9667E−06 | −2.5890E−07 | −2.9900E−08 | −3.3800E−08 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 14 | 15 | 16 | 17 |
|---|---|---|---|---|
| K: | −6.2684E+00 | −4.5183E+03 | 5.1250E−01 | −1.3917E+01 |
| A2: | 0.0000E+00 | 0.0000E+00 | 0.0000E+00 | 0.0000E+00 |
| A4: | −1.8319E−02 | 3.1548E−02 | −3.7030E−02 | −2.1771E−02 |
| A6: | 1.3249E−03 | −2.1166E−02 | 5.1616E−03 | 3.7300E−03 |
| A8: | −6.2703E−04 | 7.2940E−03 | 4.1627E−04 | −2.6282E−04 |
| A10: | 2.8694E−04 | −1.5404E−03 | −2.1318E−04 | −2.5931E−05 |
| A12: | −6.6995E−05 | 2.0769E−04 | 2.9227E−05 | 7.3230E−06 |
| A14: | 8.9952E−06 | −1.8187E−05 | −2.0793E−06 | −7.2160E−07 |
| A16: | −8.3320E−07 | 1.0062E−06 | 8.2000E−08 | 3.7800E−08 |
| A18: | 5.2600E−08 | −3.2000E−08 | −1.7000E−09 | −1.0000E−09 |
| A20: | −1.5000E−09 | 4.0000E−10 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

TABLE 14

Embodiment 4

| CRA[°] | 39.07 | CA1[mm] | 1.78 | CA16[mm] | 4.52 |
|---|---|---|---|---|---|
| IMH[mm] | 6.12 | TDP11[mm] | 0.28 | TDP15[mm] | 1.52 |

In the fourth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 12-14 as the following values, and the following conditions in Table 15 are satisfied.

TABLE 15

Embodiment 4

| (vd7 + vd8)/(vd3 + vd5) | 2.68 | TL*TDP15/TDP11[mm] | 42.28 |
|---|---|---|---|
| tan(HFOV)*TL/ImH | 1.26 | CRA*CA16/ImH[°] | 28.89 |
| f1/R11 | 1.37 | EPD*(CA16/CA1)[mm] | 9.04 |
| f3*(FOV/CRA)[mm] | −157.53 | f5/f6 | 3.55 |
| f/f4 | 0.37 | R7/R13 | 7.50 |
| f3/f8 + f4/f7 | 18.24 | f2*(R1/R12)[mm] | −27.06 |
| CRA*BFL/TDP15[°] | 26.22 | R2/R14 | −0.12 |

Fifth Embodiment

Figure 5A:
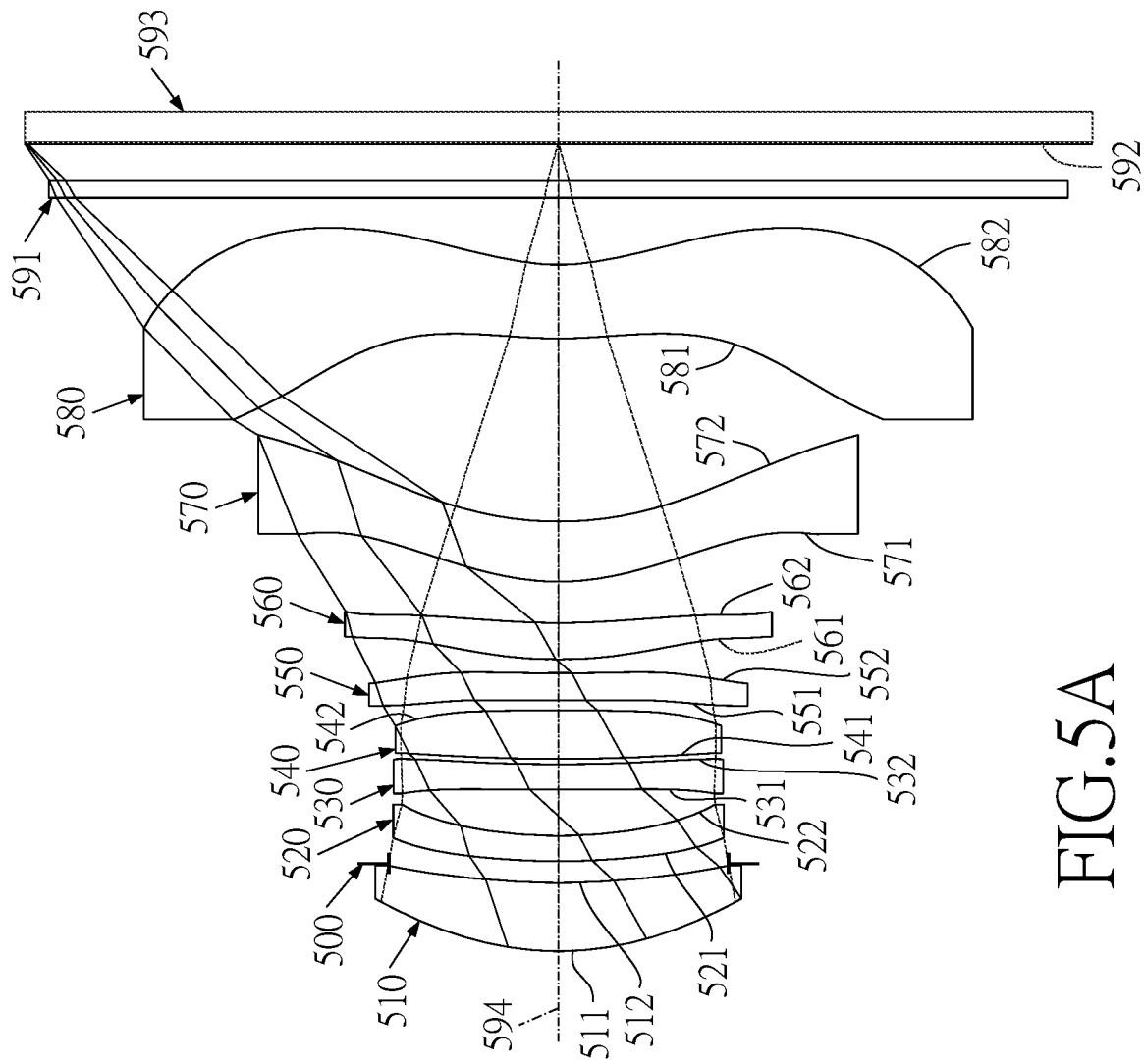
FIG. 5A is a schematic view of an optical lens assembly in accordance with a fifth embodiment of the present invention.
Figure 5B:
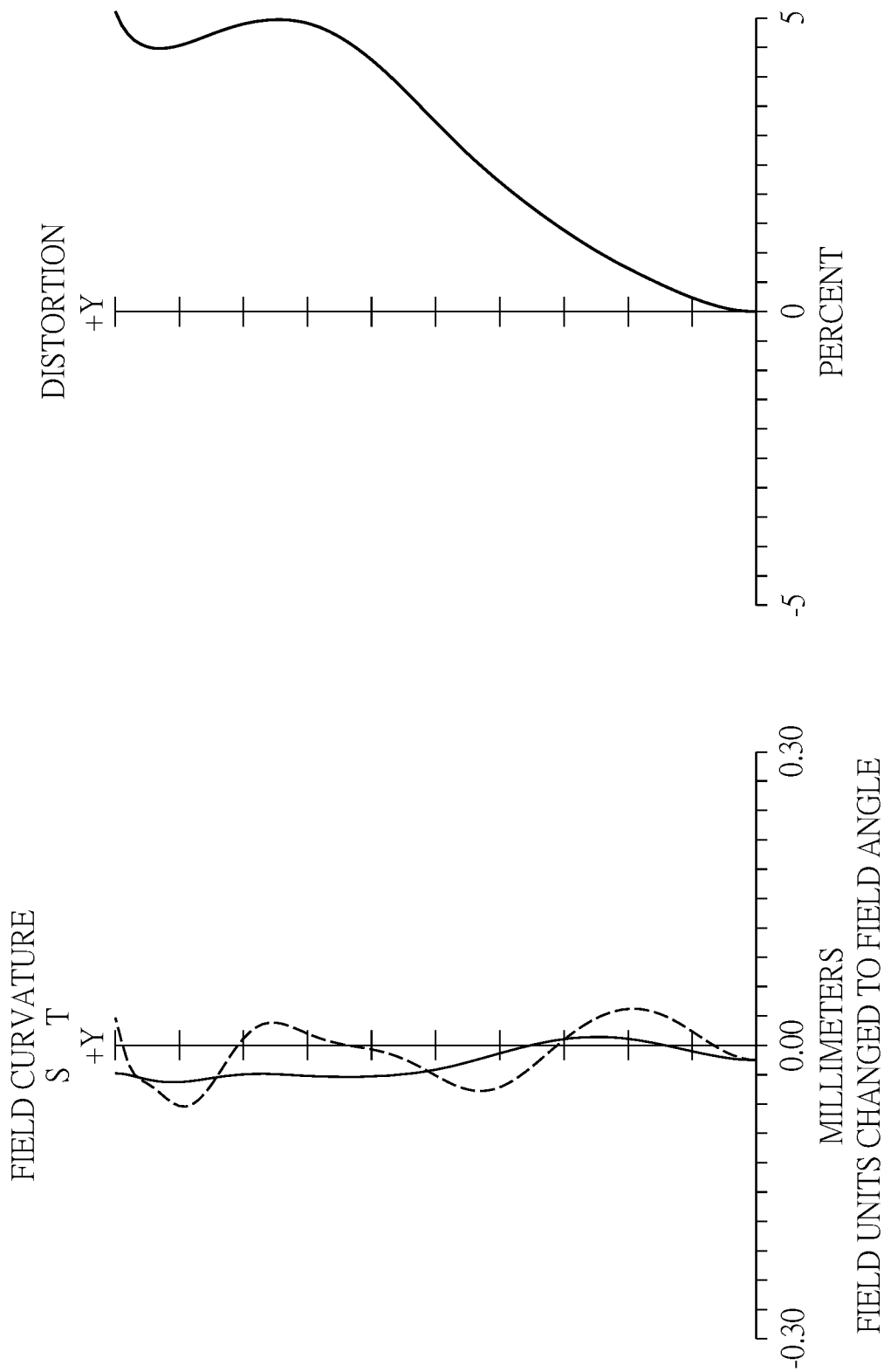
FIG. 5B is a schematic diagram showing, in order from left to right, the field curvature curve and the distortion curve of the fifth embodiment of the present invention.

Referring to FIGS. 5A and 5B, FIG. 5A shows a schematic view of an optical lens assembly in accordance with a fifth embodiment of the present invention, and FIG. 5B shows, in order from left to right, the field curvature curve and the distortion curve of the fifth embodiment of the present invention. As shown in FIG. 5A, the optical lens assembly includes, in order from an object side to an image side along an optical axis 594: a stop 500, a first lens 510, a second lens 520, a third lens 530, a fourth lens 540, a fifth lens 550, a sixth lens 560, a seventh lens 570, an eighth lens 580, an optical filter 591, and an image plane 592. The optical lens assembly can cooperate with an image sensor 593 disposed on the image plane 592. The optical lens assembly has a total of eight lenses with refractive power, but is not limited thereto.

The first lens 510 with positive refractive power includes an object-side surface 511 and an image-side surface 512, the object-side surface 511 of the first lens 510 is convex in a paraxial region thereof, the image-side surface 512 of the first lens 510 is concave in a paraxial region thereof, the object-side surface 511 and the image-side surface 512 of the first lens 510 are aspheric, and the first lens 510 is made of glass.

The second lens 520 with negative refractive power includes an object-side surface 521 and an image-side surface 522, the object-side surface 521 of the second lens 520 is convex in a paraxial region thereof, the image-side surface 522 of the second lens 520 is concave in a paraxial region thereof, the object-side surface 521 and the image-side surface 522 of the second lens 520 are aspheric, and the second lens 520 is made of plastic.

The third lens 530 with negative refractive power includes an object-side surface 531 and an image-side surface 532, the object-side surface 531 of the third lens 530 is convex in a paraxial region thereof, the image-side surface 532 of the third lens 530 is concave in a paraxial region thereof, the object-side surface 531 and the image-side surface 532 of the third lens 530 are aspheric, and the third lens 530 is made of plastic.

The fourth lens 540 with positive refractive power includes an object-side surface 541 and an image-side surface 542, the object-side surface 541 of the fourth lens 540 is convex in a paraxial region thereof, the image-side surface 542 of the fourth lens 540 is convex in a paraxial region thereof, the object-side surface 541 and the image-side surface 542 of the fourth lens 540 are aspheric, and the fourth lens 540 is made of plastic.

The fifth lens 550 with positive refractive power includes an object-side surface 551 and an image-side surface 552, the object-side surface 551 of the fifth lens 550 is concave in a paraxial region thereof, the image-side surface 552 of the fifth lens 550 is convex in a paraxial region thereof, the object-side surface 551 and the image-side surface 552 of the fifth lens 550 are aspheric, and the fifth lens 550 is made of plastic.

The sixth lens 560 with positive refractive power includes an object-side surface 561 and an image-side surface 562, the object-side surface 561 of the sixth lens 560 is convex in a paraxial region thereof, the image-side surface 562 of the sixth lens 560 is concave in a paraxial region thereof, the object-side surface 561 and the image-side surface 562 of the sixth lens 560 are aspheric, and the sixth lens 560 is made of plastic.

The seventh lens 570 with positive refractive power includes an object-side surface 571 and an image-side surface 572, the object-side surface 571 of the seventh lens 570 is convex in a paraxial region thereof, the image-side surface 572 of the seventh lens 570 is concave in a paraxial region thereof, the object-side surface 571 and the image-side surface 572 of the seventh lens 570 are aspheric, and the seventh lens 570 is made of plastic.

The eighth lens 580 with negative refractive power includes an object-side surface 581 and an image-side surface 582, the object-side surface 581 of the eighth lens 580 is convex in a paraxial region thereof, the image-side surface 582 of the eighth lens 580 is concave in a paraxial region thereof, the object-side surface 581 and the image-side surface 582 of the eighth lens 580 are aspheric, and the eighth lens 580 is made of plastic.

The optical filter 591 is made of glass, is located between the eighth lens 580 and the image plane 592, and has no influence on the focal length of the optical lens assembly. In the present embodiment, the optical filter 591 is selected from IR-cut filters that allow visible light to pass therethrough.

Please refer to Tables 16-18. The detailed optical data of the respective elements in the optical lens assembly of the fifth embodiment is shown in Table 16, and the aspheric coefficients of the lenses in the fifth embodiment is shown in Table 17.

TABLE 16

Embodiment 5 f = 7.57 mm, Fno = 1.80, FOV = 76.66°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | First lens | 3.786 | (ASP) | 0.800 | Glass | 1.589 | 61.3 | 11.33 |
| 2 | | 8.036 | (ASP) | 0.235 | | | | |
| 3 | Stop | Infinity | | 0.025 | | | | |
| 4 | Second lens | 8.357 | (ASP) | 0.300 | Plastic | 1.661 | 20.4 | −38.03 |
| 5 | | 6.196 | (ASP) | 0.543 | | | | |
| 6 | Third lens | 247.053 | (ASP) | 0.300 | Plastic | 1.671 | 19.2 | −36.89 |
| 7 | | 22.685 | (ASP) | 0.058 | | | | |
| 8 | Fourth lens | 22.354 | (ASP) | 0.575 | Plastic | 1.545 | 56.0 | 20.35 |
| 9 | | −21.903 | (ASP) | 0.112 | | | | |
| 10 | Fifth lens | −44.480 | (ASP) | 0.325 | Plastic | 1.630 | 23.6 | 253.37 |
| 11 | | −34.943 | (ASP) | 0.163 | | | | |
| 12 | Sixth lens | 8.792 | (ASP) | 0.427 | Plastic | 1.544 | 56.0 | 135.59 |
| 13 | | 9.807 | (ASP) | 0.484 | | | | |
| 14 | Seventh lens | 3.031 | (ASP) | 0.708 | Plastic | 1.545 | 56.0 | 15.49 |
| 15 | | 4.333 | (ASP) | 2.155 | | | | |
| 16 | Eighth lens | 6.049 | (ASP) | 0.868 | Plastic | 1.545 | 56.0 | −10.11 |
| 17 | | 2.741 | (ASP) | 0.787 | | | | |
| 18 | Optical filter | Infinity | | 0.210 | Glass | 1.517 | 64.2 | |
| 19 | | Infinity | | 0.425 | | | | |
| 20 | Image plane | Infinity | | — | | | | |

The reference wavelength is 555 nm.

TABLE 17

Embodiment 5
Aspheric Coefficients

| Surface | 1 | 2 | 4 | 5 |
|---|---|---|---|---|
| K: | −7.3578E−01 | −1.1665E+01 | 1.1908E+01 | 6.8793E+00 |
| A2: | 0.0000E+00 | 0.0000E+00 | 0.0000E+00 | 0.0000E+00 |
| A4: | 1.0789E−04 | −6.5811E−03 | −1.1251E−02 | 1.9364E−03 |
| A6: | −1.7526E−03 | 1.9406E−03 | 8.9229E−03 | −1.4307E−02 |
| A8: | 1.7608E−03 | 8.6746E−04 | −2.0888E−02 | 3.7303E−02 |
| A10: | −9.2110E−04 | −1.3150E−03 | 4.9345E−02 | −5.5737E−02 |
| A12: | 2.1767E−04 | 6.5034E−04 | −7.5064E−02 | 5.5208E−02 |
| A14: | −5.3720E−06 | −1.4257E−04 | 7.4490E−02 | −4.1175E−02 |
| A16: | −8.0761E−06 | 1.0199E−05 | −5.0191E−02 | 2.4773E−02 |
| A18: | 1.5623E−06 | 8.5380E−07 | 2.3497E−02 | −1.1964E−02 |
| A20: | −9.3400E−08 | −1.2300E−07 | −7.6609E−03 | 4.4039E−03 |
| A22: | 0.0000E+00 | 0.0000E+00 | 1.7072E−03 | −1.1567E−03 |
| A24: | 0.0000E+00 | 0.0000E+00 | −2.4790E−04 | 2.0079E−04 |
| A26: | 0.0000E+00 | 0.0000E+00 | 2.1136E−05 | −2.0454E−05 |
| A28: | 0.0000E+00 | 0.0000E+00 | −8.0250E−07 | 9.2180E−07 |

| Surface | 6 | 7 | 8 | 9 |
|---|---|---|---|---|
| K: | −9.9800E+01 | −4.9109E+00 | 9.9441E+01 | 9.8978E+01 |
| A2: | 0.0000E+00 | 0.0000E+00 | 0.0000E+00 | 0.0000E+00 |
| A4: | 1.1143E−02 | −5.3724E−03 | −9.3231E−03 | 3.1561E−02 |
| A6: | −5.2433E−02 | 7.1738E−03 | 8.3207E−03 | −7.6935E−02 |
| A8: | 1.7359E−01 | −8.7180E−03 | 1.1179E−02 | 1.6189E−01 |
| A10: | −3.6145E−01 | 5.8274E−02 | −3.6386E−03 | −2.5004E−01 |
| A12: | 5.0123E−01 | −1.3208E−01 | −3.5855E−02 | 2.6385E−01 |
| A14: | −4.8601E−01 | 1.4815E−01 | 5.4387E−02 | −1.9598E−01 |
| A16: | 3.3501E−01 | −9.9985E−02 | −3.8651E−02 | 1.0425E−01 |
| A18: | −1.6441E−01 | 4.4032E−02 | 1.6454E−02 | −3.9767E−02 |
| A20: | 5.6884E−02 | −1.3044E−02 | −4.5066E−03 | 1.0760E−02 |
| A22: | −1.3534E−02 | 2.5915E−03 | 8.0398E−04 | −2.0123E−03 |
| A24: | 2.1051E−03 | −3.3232E−04 | −9.0503E−05 | 2.4707E−04 |
| A26: | −1.9256E−04 | 2.4920E−05 | 5.8376E−06 | −1.7910E−05 |
| A28: | 7.8514E−06 | −8.3160E−07 | −1.6410E−07 | 5.8060E−07 |

| Surface | 10 | 11 | 12 | 13 |
|---|---|---|---|---|
| K: | −3.3643E+01 | 9.9800E+01 | −4.3294E+00 | 2.5817E+00 |
| A2: | 0.0000E+00 | 0.0000E+00 | 0.0000E+00 | 0.0000E+00 |
| A4: | 5.6213E−02 | 1.0845E−01 | 1.0217E−01 | −1.2947E−03 |
| A6: | −9.1266E−02 | −1.6787E−01 | −1.3029E−01 | −2.8376E−03 |
| A8: | 7.9943E−02 | 1.3053E−01 | 9.3174E−02 | −6.1963E−03 |
| A10: | −4.7313E−02 | −6.3781E−02 | −4.3572E−02 | 9.1092E−03 |
| A12: | 1.8579E−02 | 2.0285E−02 | 1.1746E−02 | −7.3100E−03 |
| A14: | −4.6653E−03 | −4.1767E−03 | 1.9266E−04 | 4.4588E−03 |
| A16: | 7.1884E−04 | 5.3835E−04 | −1.8001E−03 | −2.0454E−03 |
| A18: | −6.2156E−05 | −3.9709E−05 | 8.7762E−04 | 6.6930E−04 |
| A20: | 2.3216E−06 | 1.2890E−06 | −2.3704E−04 | −1.5138E−04 |
| A22: | 0.0000E+00 | 0.0000E+00 | 4.0199E−05 | 2.3017E−05 |
| A24: | 0.0000E+00 | 0.0000E+00 | −4.2534E−06 | −2.2427E−06 |
| A26: | 0.0000E+00 | 0.0000E+00 | 2.5730E−07 | 1.2640E−07 |
| A28: | 0.0000E+00 | 0.0000E+00 | −6.8000E−09 | −3.1000E−09 |

| Surface | 14 | 15 | 16 | 17 |
|---|---|---|---|---|
| K: | −3.5649E+00 | −6.3025E+00 | −3.9435E−01 | −1.3090E+00 |
| A2: | 0.0000E+00 | 0.0000E+00 | 0.0000E+00 | 0.0000E+00 |
| A4: | −7.2664E−03 | 1.1262E−02 | −3.7864E−02 | −3.6968E−02 |
| A6: | 6.5295E−03 | −1.7120E−04 | 9.0039E−03 | 7.3921E−03 |
| A8: | −6.4675E−03 | −9.8249E−04 | −5.1106E−03 | −1.5723E−03 |
| A10: | 3.9509E−03 | 4.6209E−05 | 2.8333E−03 | 3.4040E−04 |
| A12: | −1.7818E−03 | 1.5898E−04 | −1.0946E−03 | −6.4288E−05 |
| A14: | 6.1405E−04 | −7.1971E−05 | 2.9263E−04 | 9.4182E−06 |
| A16: | −1.5886E−04 | 1.6658E−05 | −5.5490E−05 | −1.0249E−06 |
| A18: | 3.0083E−05 | −2.4415E−06 | 7.5868E−06 | 8.1800E−08 |
| A20: | −4.0702E−06 | 2.3970E−07 | −7.5120E−07 | −4.8000E−09 |
| A22: | 3.8130E−07 | −1.5800E−08 | 5.3400E−08 | 2.0000E−10 |
| A24: | −2.3400E−08 | 7.0000E−10 | −2.7000E−09 | 0.0000E+00 |
| A26: | 8.0000E−10 | 0.0000E+00 | 1.0000E−10 | 0.0000E+00 |
| A28: | 0.0000E+00 | 0.0000E+00 | 0.0000E+00 | 0.0000E+00 |

TABLE 18

Embodiment 5

| CRA[°] | 40.70 | CA1[mm] | 2.18 | CA16[mm] | 4.93 |
|---|---|---|---|---|---|
| IMH[mm] | 6.33 | TDP11[mm] | 0.26 | TDP15[mm] | 0.96 |

In the fifth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 16-18 as the following values, and the following conditions in Table 19 are satisfied.

TABLE 19

Embodiment 5

| (vd7 + vd8)/(vd3 + vd5) | 2.62 | TL*TDP15/TDP11[mm] | 34.87 |
|---|---|---|---|
| tan(HFOV)*TL/ImH | 1.19 | CRA*CA16/ImH[°] | 31.71 |
| f1/R11 | 1.29 | EPD*(CA16/CA1)[mm] | 9.55 |
| f3*(FOV/CRA)[mm] | −69.49 | f5/f6 | 1.87 |
| f/f4 | 0.37 | R7/R13 | 7.38 |
| f3/f8 + f4/f7 | 4.96 | f2*(R1/R12)[mm] | −14.68 |
| CRA*BFL/TDP15[°] | 60.52 | R2/R14 | 1.85 |

Sixth Embodiment

Figure 6A:
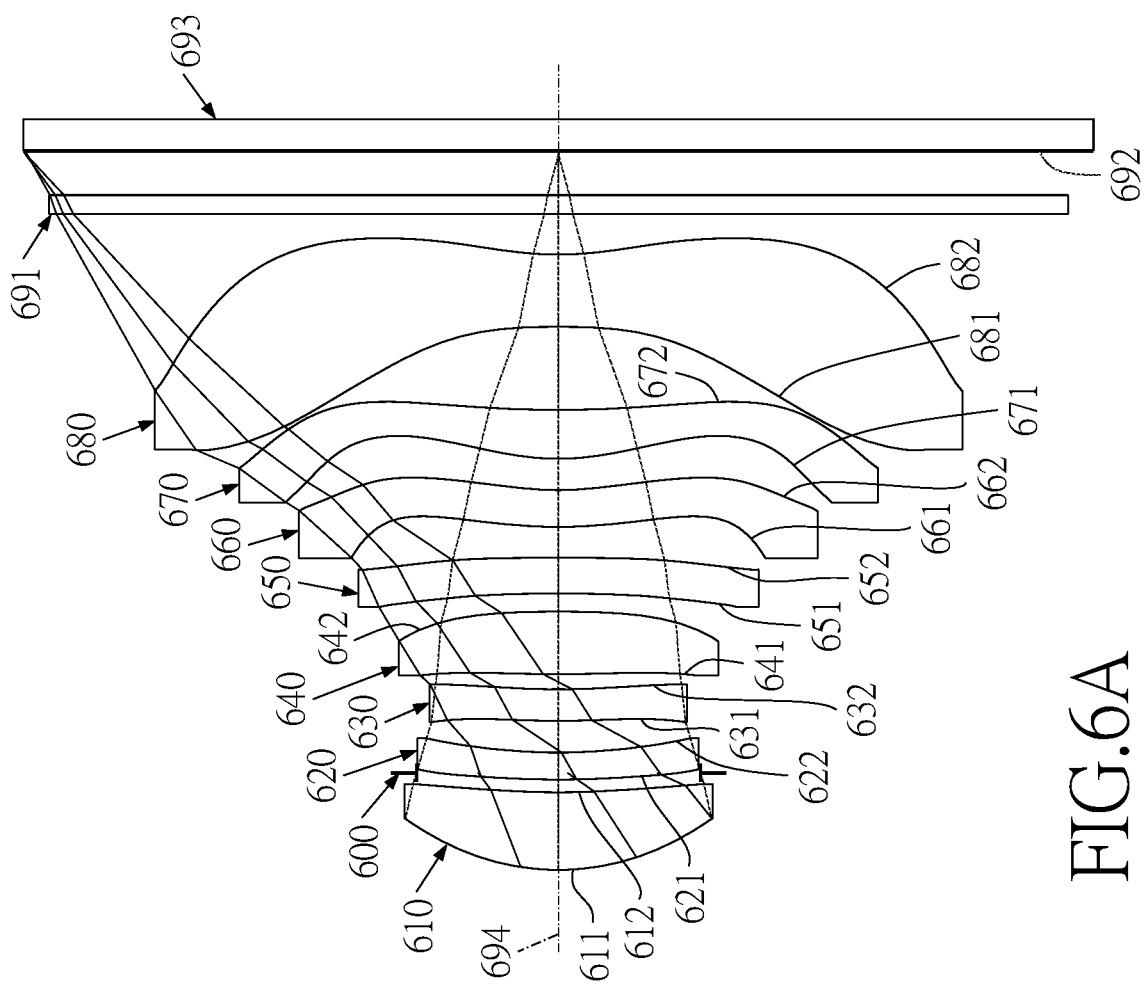
FIG. 6A is a schematic view of an optical lens assembly in accordance with a sixth embodiment of the present invention.
Figure 6B:
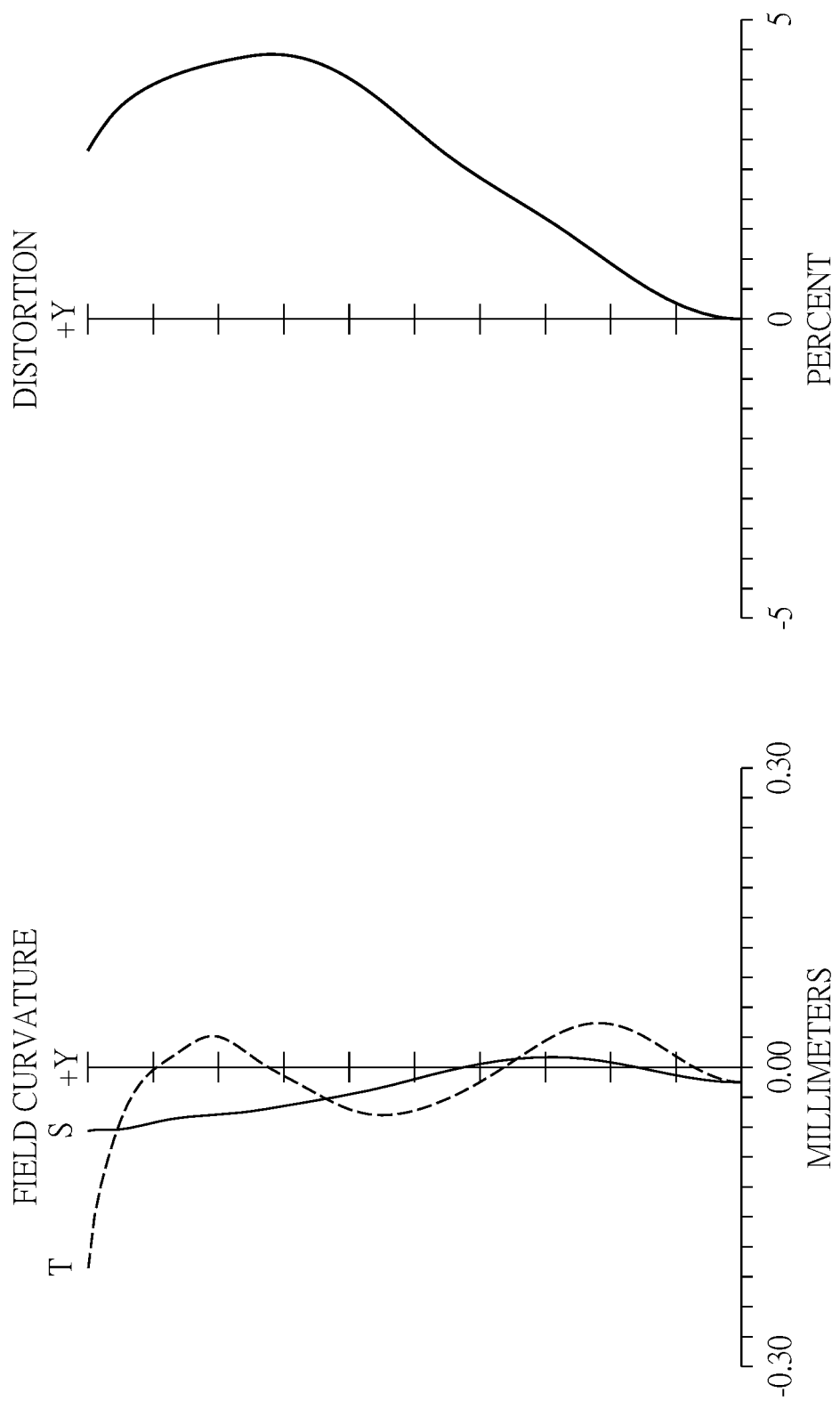
FIG. 6B is a schematic diagram showing, in order from left to right, the field curvature curve and the distortion curve of the sixth embodiment of the present invention.

Referring to FIGS. 6A and 6B, FIG. 6A shows a schematic view of an optical lens assembly in accordance with a sixth embodiment of the present invention, and FIG. 6B shows, in order from left to right, the field curvature curve and the distortion curve of the sixth embodiment of the present invention. As shown in FIG. 6A, the optical lens assembly includes, in order from an object side to an image side along an optical axis 694: a stop 600, a first lens 610, a second lens 620, a third lens 630, a fourth lens 640, a fifth lens 650, a sixth lens 660, a seventh lens 670, an eighth lens 680, an optical filter 691, and an image plane 692. The optical lens assembly can cooperate with an image sensor 693 disposed on the image plane 692. The optical lens assembly has a total of eight lenses with refractive power, but is not limited thereto.

The first lens 610 with positive refractive power includes an object-side surface 611 and an image-side surface 612, the object-side surface 611 of the first lens 610 is convex in a paraxial region thereof, the image-side surface 612 of the first lens 610 is concave in a paraxial region thereof, the object-side surface 611 and the image-side surface 612 of the first lens 610 are aspheric, and the first lens 610 is made of plastic.

The second lens 620 with negative refractive power includes an object-side surface 621 and an image-side surface 622, the object-side surface 621 of the second lens 620 is convex in a paraxial region thereof, the image-side surface 622 of the second lens 620 is concave in a paraxial region thereof, the object-side surface 621 and the image-side surface 622 of the second lens 620 are aspheric, and the second lens 620 is made of plastic.

The third lens 630 with negative refractive power includes an object-side surface 631 and an image-side surface 632, the object-side surface 631 of the third lens 630 is convex in a paraxial region thereof, the image-side surface 632 of the third lens 630 is concave in a paraxial region thereof, the object-side surface 631 and the image-side surface 632 of the third lens 630 are aspheric, and the third lens 630 is made of plastic.

The fourth lens 640 with positive refractive power includes an object-side surface 641 and an image-side surface 642, the object-side surface 641 of the fourth lens 640 is convex in a paraxial region thereof, the image-side surface 642 of the fourth lens 640 is convex in a paraxial region thereof, the object-side surface 641 and the image-side surface 642 of the fourth lens 640 are aspheric, and the fourth lens 640 is made of plastic.

The fifth lens 650 with negative refractive power includes an object-side surface 651 and an image-side surface 652, the object-side surface 651 of the fifth lens 650 is concave in a paraxial region thereof, the image-side surface 652 of the fifth lens 650 is convex in a paraxial region thereof, the object-side surface 651 and the image-side surface 652 of the fifth lens 650 are aspheric, and the fifth lens 650 is made of plastic.

The sixth lens 660 with negative refractive power includes an object-side surface 661 and an image-side surface 662, the object-side surface 661 of the sixth lens 660 is convex in a paraxial region thereof, the image-side surface 662 of the sixth lens 660 is concave in a paraxial region thereof, the object-side surface 661 and the image-side surface 662 of the sixth lens 660 are aspheric, and the sixth lens 660 is made of plastic.

The seventh lens 670 with positive refractive power includes an object-side surface 671 and an image-side surface 672, the object-side surface 671 of the seventh lens 670 is convex in a paraxial region thereof, the image-side surface 672 of the seventh lens 670 is concave in a paraxial region thereof, the object-side surface 671 and the image-side surface 672 of the seventh lens 670 are aspheric, and the seventh lens 670 is made of plastic.

The eighth lens 680 with negative refractive power includes an object-side surface 681 and an image-side surface 682, the object-side surface 681 of the eighth lens 680 is concave in a paraxial region thereof, the image-side surface 682 of the eighth lens 680 is concave in a paraxial region thereof, the object-side surface 681 and the image-side surface 682 of the eighth lens 680 are aspheric, and the eighth lens 680 is made of plastic.

The optical filter 691 is made of glass, is located between the eighth lens 680 and the image plane 692, and has no influence on the focal length of the optical lens assembly. In the present embodiment, the optical filter 691 is selected from IR-cut filters that allow visible light to pass therethrough.

Please refer to Tables 20-22. The detailed optical data of the respective elements in the optical lens assembly of the sixth embodiment is shown in Table 20, and the aspheric coefficients of the lenses in the sixth embodiment is shown in Table 21.

TABLE 20

Embodiment 6
f = 6.46 mm, Fno = 1.85, FOV = 84.99°

| Surface | | Radius of curvature | | Thickness/gap | Material | Refractive index (nd) | Abbe number (vd) | Focal length |
|---|---|---|---|---|---|---|---|---|
| 0 | Object | Infinity | | Infinity | | | | |
| 1 | First lens | 2.946 | (ASP) | 0.868 | Plastic | 1.545 | 56.0 | 6.99 |
| 2 | | 11.558 | (ASP) | 0.211 | | | | |
| 3 | Stop | Infinity | | −0.070 | | | | |
| 4 | Second lens | 12.431 | (ASP) | 0.300 | Plastic | 1.671 | 19.2 | −27.19 |
| 5 | | 7.351 | (ASP) | 0.355 | | | | |
| 6 | Third lens | 17.397 | (ASP) | 0.350 | Plastic | 1.671 | 19.2 | −49.93 |
| 7 | | 11.396 | (ASP) | 0.169 | | | | |
| 8 | Fourth lens | 21.521 | (ASP) | 0.696 | Plastic | 1.545 | 56.0 | 15.62 |
| 9 | | −13.974 | (ASP) | 0.202 | | | | |
| 10 | Fifth lens | −16.272 | (ASP) | 0.400 | Plastic | 1.643 | 22.5 | −166.30 |
| 11 | | −19.352 | (ASP) | 0.342 | | | | |
| 12 | Sixth lens | 5.952 | (ASP) | 0.410 | Plastic | 1.596 | 31.0 | −16.14 |
| 13 | | 3.589 | (ASP) | 0.350 | | | | |
| 14 | Seventh lens | 2.975 | (ASP) | 0.547 | Plastic | 1.545 | 56.0 | 6.13 |
| 15 | | 25.052 | (ASP) | 0.923 | | | | |
| 16 | Eighth lens | −10.359 | (ASP) | 0.800 | Plastic | 1.545 | 56.0 | −4.91 |
| 17 | | 3.7162 | (ASP) | 0.457 | | | | |
| 18 | Optical filter | Infinity | | 0.210 | Glass | 1.517 | 64.2 | |
| 19 | | Infinity | | 0.484 | | | | |
| 20 | Image plane | Infinity | | — | | | | |

The reference wavelength is 555 nm.

TABLE 21

Embodiment 6
Aspheric Coefficients

| Surface | 1 | 2 | 4 | 5 |
|---|---|---|---|---|
| K: | −5.3719E+00 | 1.2289E+01 | 4.2253E+01 | 5.9459E−01 |
| A2: | 0.0000E+00 | 0.0000E+00 | 0.0000E+00 | 0.0000E+00 |
| A4: | 3.9024E−02 | 2.7598E−03 | 1.0510E−02 | 2.1575E−02 |
| A6: | −4.1780E−02 | −3.1099E−03 | −2.2535E−02 | −5.1343E−02 |
| A8: | 6.3813E−02 | −2.3311E−02 | −5.9085E−03 | 6.1963E−02 |
| A10: | −6.5175E−02 | 4.4611E−02 | 3.5158E−02 | −5.4915E−02 |
| A12: | 4.2529E−02 | −4.0760E−02 | −3.6145E−02 | 3.6393E−02 |
| A14: | −1.7601E−02 | 2.2035E−02 | 2.0098E−02 | −1.6318E−02 |
| A16: | 4.4653E−03 | −7.1563E−03 | −6.6387E−03 | 4.4781E−03 |
| A18: | −6.3319E−04 | 1.2902E−03 | 1.2289E−03 | −6.5784E−04 |
| A20: | 3.8393E−05 | −9.9271E−05 | −9.8415E−05 | 3.8734E−05 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

TABLE 21-continued

Embodiment 6
Aspheric Coefficients

| Surface | 6 | 7 | 8 | 9 |
|---|---|---|---|---|
| K: | −9.9800E+01 | 1.3635E+01 | 9.9800E+01 | 3.7851E+01 |
| A2: | 0.0000E+00 | 0.0000E+00 | 0.0000E+00 | 0.0000E+00 |
| A4: | 6.9863E−03 | 1.5377E−02 | −6.9269E−03 | 1.3195E−03 |
| A6: | −1.9682E−02 | −3.6765E−02 | 1.1327E−02 | −3.5775E−02 |
| A8: | −3.2014E−03 | 2.6389E−02 | −3.8005E−02 | 3.8337E−02 |
| A10: | 1.4606E−02 | −1.6911E−02 | 4.2480E−02 | −2.5493E−02 |
| A12: | −1.1455E−02 | 1.0379E−02 | −2.7240E−02 | 1.1703E−02 |
| A14: | 4.9263E−03 | −4.6359E−03 | 1.0925E−02 | −3.8382E−03 |
| A16: | −1.3604E−03 | 1.2592E−03 | −2.6975E−03 | 8.5205E−04 |
| A18: | 2.3440E−04 | −1.8107E−04 | 3.7411E−04 | −1.1213E−04 |
| A20: | −1.8175E−05 | 1.0473E−05 | −2.2198E−05 | 6.4722E−06 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 10 | 11 | 12 | 13 |
|---|---|---|---|---|
| K: | 3.5204E+01 | 7.2040E+00 | −3.7736E+00 | −8.1489E+00 |
| A2: | 0.0000E+00 | 0.0000E+00 | 0.0000E+00 | 0.0000E+00 |
| A4: | 2.1848E−02 | 3.7748E−02 | −1.2487E−02 | −6.1518E−02 |
| A6: | −3.6453E−02 | −4.7928E−02 | 1.2352E−02 | 4.7345E−02 |
| A8: | 1.3345E−02 | 2.1521E−02 | −1.5620E−02 | −2.8299E−02 |
| A10: | 8.6711E−03 | −1.8412E−03 | 8.3206E−03 | 1.0983E−02 |
| A12: | −9.6712E−03 | −1.9462E−03 | −2.4496E−03 | −2.7200E−03 |
| A14: | 3.8591E−03 | 8.3903E−04 | 4.0801E−04 | 4.2125E−04 |
| A16: | −8.0564E−04 | −1.5215E−04 | −3.7542E−05 | −3.9334E−05 |
| A18: | 8.7971E−05 | 1.3393E−05 | 1.6447E−06 | 2.0277E−06 |
| A20: | −3.9930E−06 | −4.6260E−07 | −1.7500E−08 | −4.4500E−08 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 0.0000E+00 | 0.0000E+00 |

| Surface | 14 | 15 | 16 | 17 |
|---|---|---|---|---|
| K: | −4.6879E+00 | −4.9685E+01 | 8.9102E−01 | −9.0745E+00 |
| A2: | 0.0000E+00 | 0.0000E+00 | 0.0000E+00 | 0.0000E+00 |
| A4: | −1.8864E−02 | 2.5506E−02 | −3.3825E−02 | −2.1777E−02 |
| A6: | 2.1722E−03 | −1.8466E−02 | 1.7949E−03 | 3.0861E−03 |
| A8: | −1.4230E−03 | 6.8475E−03 | 1.8603E−03 | −9.8784E−05 |
| A10: | 6.3931E−04 | −1.6431E−03 | −5.4544E−04 | −4.4285E−05 |
| A12: | −1.8249E−04 | 2.5518E−04 | 7.4105E−05 | 8.1304E−06 |
| A14: | 3.3763E−05 | −2.5553E−05 | −5.7534E−06 | −6.9320E−07 |
| A16: | −3.9573E−06 | 1.5908E−06 | 2.6140E−07 | 3.3200E−08 |
| A18: | 2.6160E−07 | −5.5800E−08 | −6.5000E−09 | −9.0000E−10 |
| A20: | −7.3000E−09 | 8.0000E−10 | 1.0000E−10 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| A26: | 0.0000E+00 | 0.0000E+00 | 0.0000E+00 | 0.0000E+00 |
| A28: | 0.0000E+00 | 0.0000E+00 | 8.9102E−01 | 0.0000E+00 |

TABLE 22

Embodiment 6

| CRA[°] | 36.95 | CA1[mm] | 1.76 | CA16[mm] | 4.62 |
|---|---|---|---|---|---|
| IMH[mm] | 6.12 | TDP11 [mm] | 0.35 | TDP15[mm] | 1.37 |

In the sixth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 20-22 as the following values, and the following conditions in Table 23 are satisfied.

TABLE 23

Embodiment 6

| (vd7 + vd8)/(vd3 + vd5) | 2.68 | TL*TDP15/TDP11[mm] | 31.35 |
|---|---|---|---|
| tan(HFOV)*TL/ImH | 1.20 | CRA*CA16/ImH[°] | 27.89 |
| f1/R11 | 1.17 | EPD*(CA16/CA1)[mm] | 9.16 |
| f3*(FOV/CRA)[mm] | −114.86 | f5/f6 | 10.30 |
| f/f4 | 0.41 | R7/R13 | 7.23 |
| f3/f8 + f4/f7 | 12.72 | f2*(R1/R12)[mm] | −22.32 |
| CRA*BFL/TDP15[°] | 31.01 | R2/R14 | 0.46 |

Seventh Embodiment

Figure 7A:
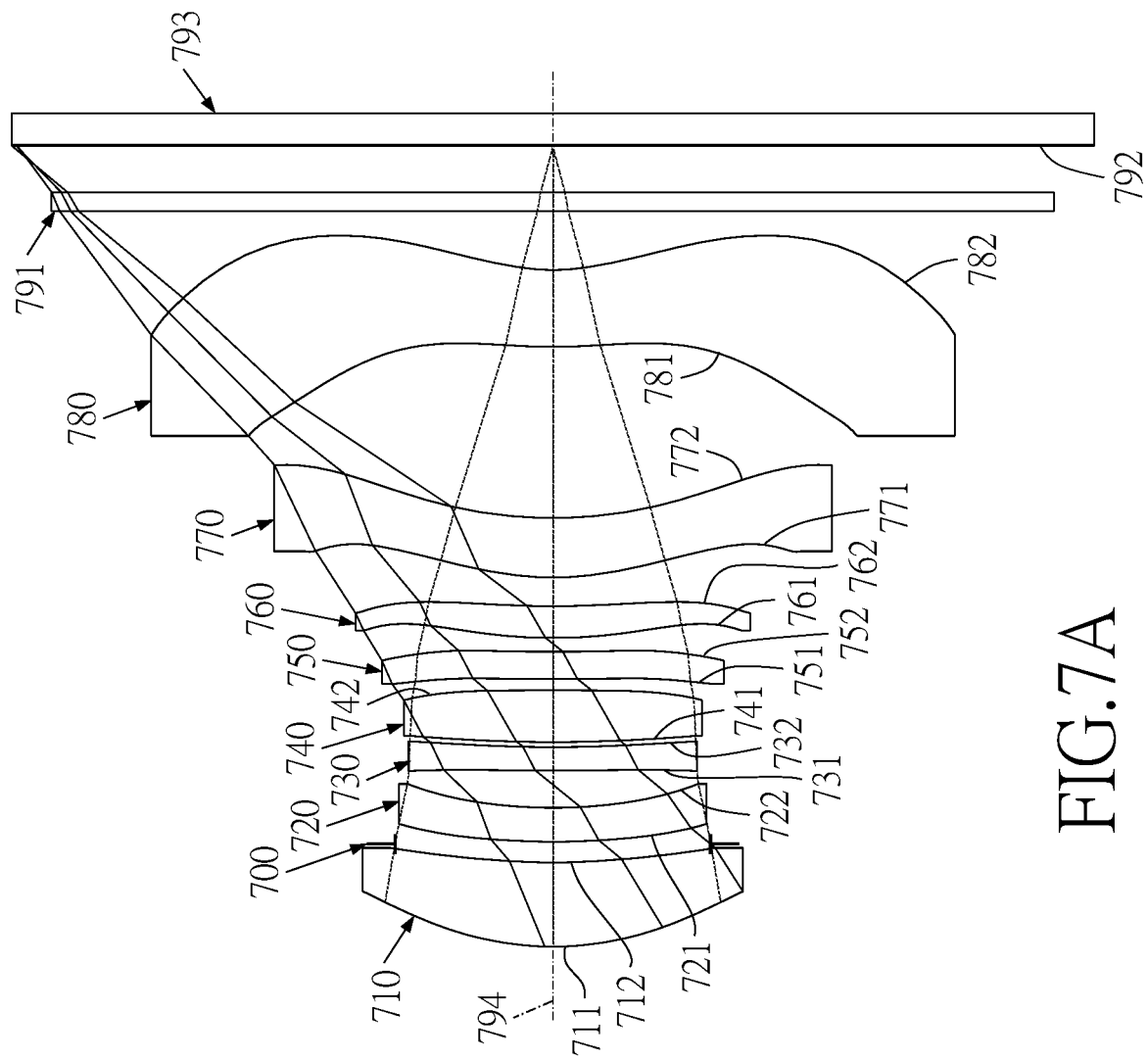
FIG. 7A is a schematic view of an optical lens assembly in accordance with a seventh embodiment of the present invention.
Figure 7B:
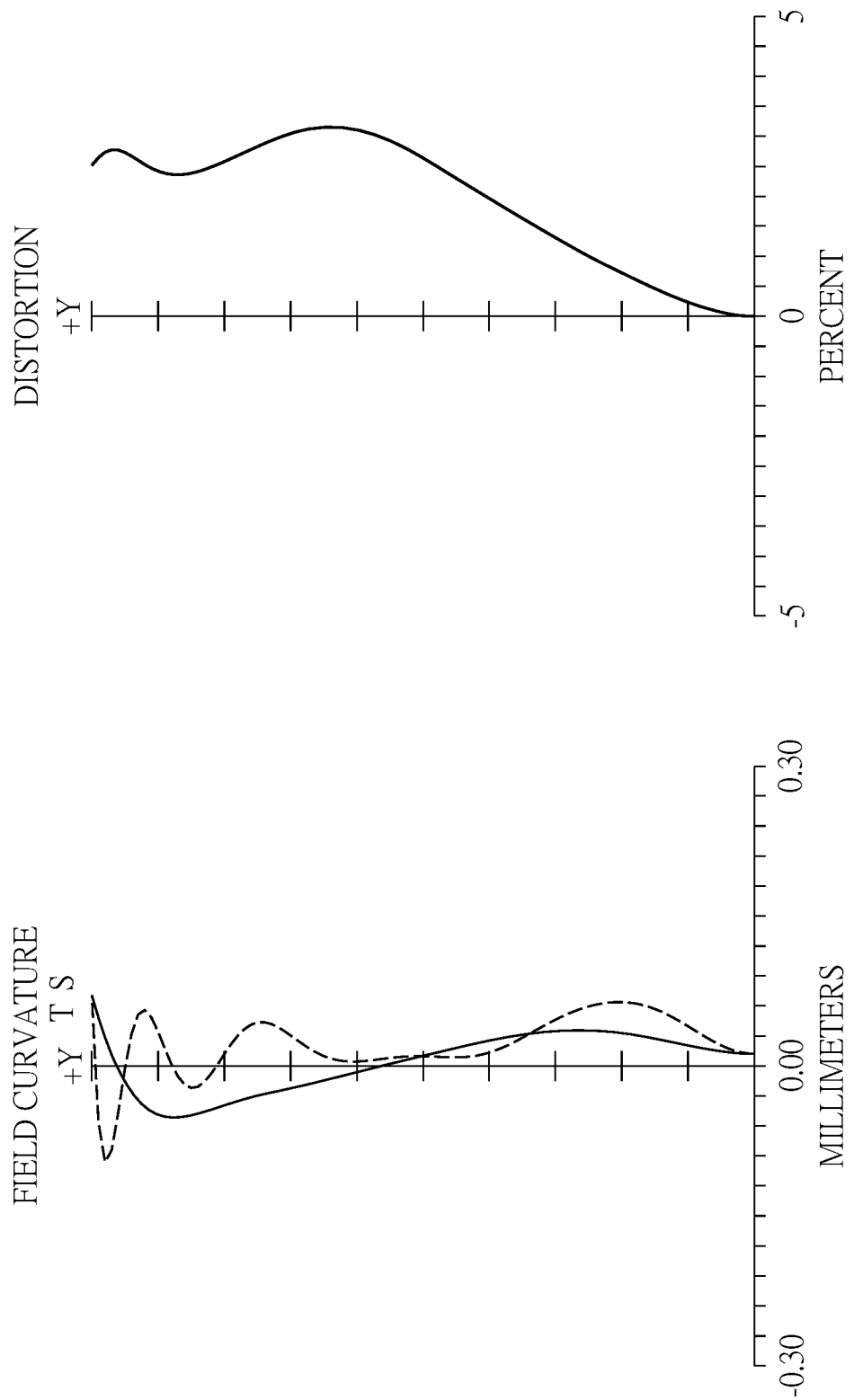
FIG. 7B is a schematic diagram showing, in order from left to right, the field curvature curve and the distortion curve of the seventh embodiment of the present invention.

Referring to FIGS. 7A and 7B, FIG. 7A shows a schematic view of an optical lens assembly in accordance with a seventh embodiment of the present invention, and FIG. 7B shows, in order from left to right, the field curvature curve and the distortion curve of the seventh embodiment of the present invention. As shown in FIG. 7A, the optical lens assembly includes, in order from an object side to an image side along an optical axis 794: a stop 700, a first lens 710, a second lens 720, a third lens 730, a fourth lens 740, a fifth lens 750, a sixth lens 760, a seventh lens 770, an eighth lens 780, an optical filter 791, and an image plane 792. The optical lens assembly can cooperate with an image sensor 793 disposed on the image plane 792. The optical lens assembly has a total of eight lenses with refractive power, but is not limited thereto.

The first lens 710 with positive refractive power includes an object-side surface 711 and an image-side surface 712, the object-side surface 711 of the first lens 710 is convex in a paraxial region thereof, the image-side surface 712 of the first lens 710 is concave in a paraxial region thereof, the object-side surface 711 and the image-side surface 712 of the first lens 710 are aspheric, and the first lens 710 is made of glass.

The second lens 720 with negative refractive power includes an object-side surface 721 and an image-side surface 722, the object-side surface 721 of the second lens 720 is convex in a paraxial region thereof, the image-side surface 722 of the second lens 720 is concave in a paraxial region thereof, the object-side surface 721 and the image-side surface 722 of the second lens 720 are aspheric, and the second lens 720 is made of plastic.

The third lens 730 with negative refractive power includes an object-side surface 731 and an image-side surface 732, the object-side surface 731 of the third lens 730 is convex in a paraxial region thereof, the image-side surface 732 of the third lens 730 is concave in a paraxial region thereof, the object-side surface 731 and the image-side surface 732 of the third lens 730 are aspheric, and the third lens 730 is made of plastic.

The fourth lens 740 with positive refractive power includes an object-side surface 741 and an image-side surface 742, the object-side surface 741 of the fourth lens 740 is convex in a paraxial region thereof, the image-side surface 742 of the fourth lens 740 is convex in a paraxial region thereof, the object-side surface 741 and the image-side surface 742 of the fourth lens 740 are aspheric, and the fourth lens 740 is made of plastic.

The fifth lens 750 with positive refractive power includes an object-side surface 751 and an image-side surface 752, the object-side surface 751 of the fifth lens 750 is concave in a paraxial region thereof, the image-side surface 752 of the fifth lens 750 is convex in a paraxial region thereof, the object-side surface 751 and the image-side surface 752 of the fifth lens 750 are aspheric, and the fifth lens 750 is made of plastic.

The sixth lens 760 with positive refractive power includes an object-side surface 761 and an image-side surface 762, the object-side surface 761 of the sixth lens 760 is convex in a paraxial region thereof, the image-side surface 762 of the sixth lens 760 is concave in a paraxial region thereof, the object-side surface 761 and the image-side surface 762 of the sixth lens 760 are aspheric, and the sixth lens 760 is made of plastic.

The seventh lens 770 with positive refractive power includes an object-side surface 771 and an image-side surface 772, the object-side surface 771 of the seventh lens 770 is convex in a paraxial region thereof, the image-side surface 772 of the seventh lens 770 is concave in a paraxial region thereof, the object-side surface 771 and the image-side surface 772 of the seventh lens 770 are aspheric, and the seventh lens 770 is made of plastic.

The eighth lens 780 with negative refractive power includes an object-side surface 781 and an image-side surface 782, the object-side surface 781 of the eighth lens 780 is convex in a paraxial region thereof, the image-side surface 782 of the eighth lens 780 is concave in a paraxial region thereof, the object-side surface 781 and the image-side surface 782 of the eighth lens 780 are aspheric, and the eighth lens 780 is made of plastic.

The optical filter 791 is made of glass, is located between the eighth lens 780 and the image plane 792, and has no influence on the focal length of the optical lens assembly. In the present embodiment, the optical filter 791 is selected from IR-cut filters that allow visible light to pass therethrough.

Please refer to Tables 24-26. The detailed optical data of the respective elements in the optical lens assembly of the seventh embodiment is shown in Table 24, and the aspheric coefficients of the lenses in the seventh embodiment is shown in Table 25.

TABLE 25

Embodiment 7
Aspheric Coefficients

| Surface | 1 | 2 | 4 | 5 |
|---|---|---|---|---|
| K: | −7.0512E−01 | −1.2431E+01 | 1.1816E+01 | 6.6629E+00 |
| A2: | 0.0000E+00 | 0.0000E+00 | 0.0000E+00 | 0.0000E+00 |
| A4: | 3.3976E−04 | −7.9171E−03 | −1.3174E−02 | 1.9990E−03 |
| A6: | −2.3295E−03 | 2.5616E−03 | 1.1770E−02 | −1.8961E−02 |
| A8: | 2.5886E−03 | 1.2861E−03 | −3.0824E−02 | 5.4988E−02 |
| A10: | −1.5202E−03 | −2.1693E−03 | 8.1325E−02 | −9.1864E−02 |
| A12: | 4.0034E−04 | 1.1974E−03 | −1.3824E−01 | 1.0167E−01 |
| A14: | −1.1117E−05 | −2.9387E−04 | 1.5329E−01 | −8.4732E−02 |
| A16: | −1.8592E−05 | 2.3390E−05 | −1.1541E−01 | 5.6967E−02 |
| A18: | 4.0111E−06 | 2.1660E−06 | 6.0375E−02 | −3.0742E−02 |
| A20: | −2.6760E−07 | −3.6100E−07 | −2.1996E−02 | 1.2645E−02 |
| A22: | 0.0000E+00 | 0.0000E+00 | 5.4773E−03 | −3.7112E−03 |
| A24: | 0.0000E+00 | 0.0000E+00 | −8.8876E−04 | 7.1986E−04 |
| A26: | 0.0000E+00 | 0.0000E+00 | 8.4672E−05 | −8.1943E−05 |
| A28: | 0.0000E+00 | 0.0000E+00 | −3.5926E−06 | 4.1267E−06 |

| Surface | 6 | 7 | 8 | 9 |
|---|---|---|---|---|
| K: | 2.0006E+03 | −5.7435E−01 | 1.0001E+02 | 9.0219E+01 |
| A2: | 0.0000E+00 | 0.0000E+00 | 0.0000E+00 | 0.0000E+00 |
| A4: | 1.3275E−02 | −6.4422E−03 | −1.0986E−02 | 3.7322E−02 |
| A6: | −6.9176E−02 | 9.4901E−03 | 1.0907E−02 | −1.0140E−01 |
| A8: | 2.5603E−01 | −1.2840E−02 | 1.6457E−02 | 2.3878E−01 |
| A10: | −5.9571E−01 | 9.6038E−02 | −5.9946E−03 | −4.1209E−01 |
| A12: | 9.2307E−01 | −2.4323E−01 | −6.6033E−02 | 4.8591E−01 |
| A14: | −1.0001E+00 | 3.0487E−01 | 1.1192E−01 | −4.0329E−01 |
| A16: | 7.7035E−01 | −2.2992E−01 | −8.8878E−02 | 2.3971E−01 |
| A18: | −4.2245E−01 | 1.1314E−01 | 4.2279E−02 | −1.0218E−01 |
| A20: | 1.6333E−01 | −3.7453E−02 | −1.2940E−02 | 3.0895E−02 |
| A22: | −4.3424E−02 | 8.3146E−03 | 2.5795E−03 | −6.4561E−03 |
| A24: | 7.5470E−03 | −1.1914E−03 | −3.2447E−04 | 8.8579E−04 |
| A26: | −7.7141E−04 | 9.9833E−05 | 2.3386E−05 | −7.1749E−05 |
| A28: | 3.5147E−05 | −3.7222E−06 | −7.3450E−07 | 2.5989E−06 |

TABLE 24

Embodiment 7
f = 7.22 mm, Fno = 1.89, FOV = 79.17°

| Surface | | Radius of curvature | | Thickness/ gap | Material | Refractive index (nd) | Abbe number (vd) | Focal length |
|---|---|---|---|---|---|---|---|---|
| 0 | Object | Infinity | | Infinity | | | | |
| 1 | First lens | 3.629 | (ASP) | 0.936 | Glass | 1.589 | 61.3 | 10.27 |
| 2 | | 8.157 | (ASP) | 0.203 | | | | |
| 3 | Stop | Infinity | | 0.024 | | | | |
| 4 | Second lens | 8.113 | (ASP) | 0.381 | Plastic | 1.661 | 20.4 | −37.80 |
| 5 | | 6.023 | (ASP) | 0.413 | | | | |
| 6 | Third lens | 104.954 | (ASP) | 0.261 | Plastic | 1.671 | 19.2 | −36.53 |
| 7 | | 20.008 | (ASP) | 0.054 | | | | |
| 8 | Fourth lens | 19.417 | (ASP) | 0.576 | Plastic | 1.545 | 56.0 | 19.07 |
| 9 | | −22.243 | (ASP) | 0.124 | | | | |
| 10 | Fifth lens | −62.063 | (ASP) | 0.305 | Plastic | 1.630 | 23.6 | 171.57 |
| 11 | | −39.611 | (ASP) | 0.151 | | | | |
| 12 | Sixth lens | 10.411 | (ASP) | 0.350 | Plastic | 1.544 | 56.0 | 189.08 |
| 13 | | 11.442 | (ASP) | 0.319 | | | | |
| 14 | Seventh lens | 3.571 | (ASP) | 0.663 | Plastic | 1.545 | 56.0 | 14.86 |
| 15 | | 5.957 | (ASP) | 1.899 | | | | |
| 16 | Eighth lens | 6.615 | (ASP) | 0.852 | Plastic | 1.545 | 56.0 | −8.58 |
| 17 | | 2.618 | (ASP) | 0.653 | | | | |
| 18 | Optical filter | Infinity | | 0.210 | Glass | 1.517 | 64.2 | |
| 19 | | Infinity | | 0.515 | | | | |
| 20 | Image plane | Infinity | | — | | | | |

The reference wavelength is 555 nm.

TABLE 25-continued

Embodiment 7
Aspheric Coefficients

| Surface | 10 | 11 | 12 | 13 |
|---|---|---|---|---|
| K: | 6.5901E+01 | 5.2596E+01 | −1.0334E+01 | −1.4045E+00 |
| A2: | 0.0000E+00 | 0.0000E+00 | 0.0000E+00 | 0.0000E+00 |
| A4: | 6.5868E−02 | 1.2802E−01 | 1.1999E−01 | −1.8567E−03 |
| A6: | −1.2051E−01 | −2.2165E−01 | −1.7200E−01 | −4.0988E−03 |
| A8: | 1.1786E−01 | 1.9249E−01 | 1.3736E−01 | −9.1930E−03 |
| A10: | −7.7978E−02 | −1.0512E−01 | −7.1834E−02 | 1.5007E−02 |
| A12: | 3.4215E−02 | 3.7355E−02 | 2.1629E−02 | −1.3463E−02 |
| A14: | −9.6012E−03 | −8.5952E−03 | 3.9618E−04 | 9.1756E−03 |
| A16: | 1.6530E−03 | 1.2379E−03 | −4.1394E−03 | −4.7033E−03 |
| A18: | −1.5974E−04 | −1.0202E−04 | 2.2551E−03 | 1.7198E−03 |
| A20: | 6.6611E−06 | 3.6985E−06 | −6.8058E−04 | −4.3464E−04 |
| A22: | 0.0000E+00 | 0.0000E+00 | 1.2897E−04 | 7.3846E−05 |
| A24: | 0.0000E+00 | 0.0000E+00 | −1.5249E−05 | −8.0405E−06 |
| A26: | 0.0000E+00 | 0.0000E+00 | 1.0307E−06 | 5.0650E−07 |
| A28: | 0.0000E+00 | 0.0000E+00 | −3.0500E−08 | −1.4000E−08 |

| Surface | 14 | 15 | 16 | 17 |
|---|---|---|---|---|
| K: | −4.6450E+00 | −7.3660E+00 | −3.9175E−02 | −1.2863E+00 |
| A2: | 0.0000E+00 | 0.0000E+00 | 0.0000E+00 | 0.0000E+00 |
| A4: | −9.0610E−03 | 1.2920E−02 | −4.4461E−02 | −4.4287E−02 |
| A6: | 8.6276E−03 | −2.5852E−04 | 1.1905E−02 | 9.7550E−03 |
| A8: | −9.5364E−03 | −1.4523E−03 | −7.5374E−03 | −2.3190E−03 |
| A10: | 6.5104E−03 | 7.5899E−05 | 4.6695E−03 | 5.6102E−04 |
| A12: | −3.2817E−03 | 2.9276E−04 | −2.0157E−03 | −1.1839E−04 |
| A14: | 1.2636E−03 | −1.4811E−04 | 6.0219E−04 | 1.9381E−05 |
| A16: | −3.6530E−04 | 3.8305E−05 | −1.2760E−04 | −2.3567E−06 |
| A18: | 7.7297E−05 | −6.2735E−06 | 1.9494E−05 | 2.1030E−07 |
| A20: | −1.1687E−05 | 6.8820E−07 | −2.1567E−06 | −1.3700E−08 |
| A22: | 1.2232E−06 | −5.0700E−08 | 1.7130E−07 | 6.0000E−10 |
| A24: | −8.4000E−08 | 2.4000E−09 | −9.5000E−09 | 0.0000E+00 |
| A26: | 3.4000E−09 | −1.0000E−10 | 4.0000E−10 | 0.0000E+00 |
| A28: | −1.0000E−10 | 0.0000E+00 | 0.0000E+00 | 0.0000E+00 |

TABLE 26

Embodiment 7

| | | | | | |
|---|---|---|---|---|---|
| CRA[°] | 44.82 | CA1[mm] | 2.17 | CA16[mm] | 4.58 |
| IMH[mm] | 6.12 | TDP11 [mm] | 0.08 | TDP15[mm] | 0.99 |

In the seventh embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 24-26 as the following values, and the following conditions in Table 27 are satisfied.

TABLE 27

Embodiment 7

| | | | |
|---|---|---|---|
| (vd7 + vd8)/(vd3 + vd5) | 2.62 | TL*TDP15/TDP11 [mm] | 109.46 |
| tan(HFOV)*TL/ImH | 1.20 | CRA*CA16/ImH[°] | 33.55 |
| f1/R11 | 0.99 | EPD*(CA16/CA1)[mm] | 8.07 |
| f3*(FOV/CRA)[mm] | −64.54 | f5/f6 | 0.91 |
| f/f4 | 0.38 | R7/R13 | 5.44 |
| f3/f8 + f4/f7 | 5.54 | f2*(R1/R12)[mm] | −11.99 |
| CRA*BFL/TDP15[°] | 62.32 | R2/R14 | 1.37 |

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly. Moreover, any of the object-side and image-side surfaces of a respective lens of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, the optical filter is made of, but not limited to, glass and can be made of other materials with high Abbe numbers.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in focus-adjustable optical systems according to the actual requirements and have good aberration correction ability and better image quality. The optical lens assembly of the present invention can also be used in electronic imaging systems, such as, 3D image capturing device, wearable display of virtual reality (VR) or augmented reality (AR), game player, surveillance camera, digital camera, mobile device, tablet computer, sports camera, camera drone, household electronic device or vehicle camera.

What is claimed is:

1. An optical lens assembly comprising, in order from an object side to an image side:
    a first lens with positive refractive power;
    a second lens with negative refractive power;
    a third lens with negative refractive power;
    a fourth lens with refractive power;
    a fifth lens with refractive power;
    a sixth lens with refractive power;
    a seventh lens with refractive power; and
    an eighth lens with negative refractive power;
    wherein an incident angle of a chief ray on an image plane at a maximum view angle of the optical lens assembly is CRA, a distance from an image-side surface of the eighth lens to the image plane along an optical axis is BFL, an absolute value of a displacement in parallel to the optical axis from an intersection between an object-side surface of the eighth lens and the optical axis to a maximum effective radius position on the object-side surface of the eighth lens is TDP15, and the following condition is satisfied: 19.04°<CRA*BFL/TDP15<74.78°.

2. The optical lens assembly as claimed in claim 1, wherein a distance from an object-side surface of the first lens to the image plane along the optical axis is TL, an absolute value of a displacement in parallel to the optical axis from an intersection between an object-side surface of the sixth lens and the optical axis to a maximum effective radius position on the object-side surface of the sixth lens is TDP11, the absolute value of the displacement in parallel to the optical axis from the intersection between the object-side surface of the eighth lens and the optical axis to the maximum effective radius position on the object-side surface of the eighth lens is TDP15, and the following condition is satisfied: 22.00 mm<TL*TDP15/TDP11<131.36 mm.

3. The optical lens assembly as claimed in claim 1, wherein the incident angle of the chief ray on the image plane at the maximum view angle of the optical lens assembly is CRA, a maximum effective radius of the image-side surface of the eighth lens is CA16, a maximum image height of the optical lens assembly is IMH, and the following condition is satisfied: 22.18°<CRA*CA16/IMH<40.26°.

4. The optical lens assembly as claimed in claim 1, wherein an entrance pupil diameter of the optical lens assembly is EPD, a maximum effective radius of an object-side surface of the first lens is CA1, a maximum effective radius of the image-side surface of the eighth lens is CA16, and the following condition is satisfied: 6.46 mm<EPD*(CA16/CA1)<11.65 mm.

5. The optical lens assembly as claimed in claim 1, wherein a focal length of the fifth lens is f5, a focal length of the sixth lens is f6, and the following condition is satisfied: 0.73<f5/f6<12.36.

6. The optical lens assembly as claimed in claim 5, wherein a radius of curvature of an object-side surface of the fourth lens is R7, a radius of curvature of an object-side surface of the seventh lens is R13, and the following condition is satisfied: 4.35<R7/R13<9.18.

7. The optical lens assembly as claimed in claim 1, wherein a focal length of the second lens is f2, a radius of curvature of an object-side surface of the first lens is R1, a radius of curvature of an image-side surface of the sixth lens is R12, and the following condition is satisfied: −32.47 mm<f2*(R1/R12)<−9.59 mm.

8. The optical lens assembly as claimed in claim 7, wherein a radius of curvature of an image-side surface of the first lens is R2, a radius of curvature of an image-side surface of the seventh lens is R14, and the following condition is satisfied: −0.14<R2/R14<2.23.

9. The optical lens assembly as claimed in claim 1, wherein an Abbe number of the third lens is Vd3, an Abbe number of the fifth lens is Vd5, an Abbe number of the seventh lens is Vd7, an Abbe number of the eighth lens is Vd8, and the following condition is satisfied: 2.09<(Vd7+Vd8)/(Vd3+Vd5)<3.22.

10. The optical lens assembly as claimed in claim 1, wherein half of a maximum field of view of the optical lens assembly is HFOV, a distance from an object-side surface of the first lens to the image plane along the optical axis is TL, a maximum image height of the optical lens assembly is IMH, and the following condition is satisfied: 0.92<tan(HFOV)*TL/IMH<1.51.

11. The optical lens assembly as claimed in claim 1, wherein a focal length of the first lens is f1, a radius of curvature of an object-side surface of the sixth lens is R11, and the following condition is satisfied: 0.79<f1/R11<1.65.

12. The optical lens assembly as claimed in claim 1, wherein a focal length of the optical lens assembly is f, a focal length of the fourth lens is f4, and the following condition is satisfied: 0.29<f/f4<0.5.

13. The optical lens assembly as claimed in claim 1, wherein a focal length of the third lens is f3, a maximum field of view of the optical lens assembly is FOV, the incident angle of the chief ray on the image plane at the maximum view angle of the optical lens assembly is CRA, and the following condition is satisfied: −209.04 mm<f3*(FOV/CRA)<−51.63 mm.

14. The optical lens assembly as claimed in claim 13, wherein the focal length of the third lens is f3, a focal length of the fourth lens is f4, a focal length of the seventh lens is f7, a focal length of the eighth lens is f8, and the following condition is satisfied: 3.97<f3/f8+f4/f7<21.89.

15. The optical lens assembly as claimed in claim 1, wherein the incident angle of the chief ray on the image plane at the maximum view angle of the optical lens assembly is CRA, a maximum effective radius of the image-side surface of the eighth lens is CA16, a maximum image height of the optical lens assembly is IMH, an entrance pupil diameter of the optical lens assembly is EPD, a maximum effective radius of an object-side surface of the first lens is CA1, and the following conditions are satisfied: 22.18°<CRA*CA16/IMH<40.26° and 6.46 mm<EPD*(CA16/CA1)<11.65 mm.

* * * * *